(12) United States Patent
Teshima et al.

(10) Patent No.: US 11,821,394 B2
(45) Date of Patent: Nov. 21, 2023

(54) FUEL SUPPLY APPARATUS

(71) Applicants: AISAN KOGYO KABUSHIKI KAISHA, Obu (JP); TOYOTA JIDOSHA KABUSHIKI KAISHA, Toyota (JP)

(72) Inventors: Nobutaka Teshima, Toyota (JP); Tetsuji Aishima, Toyota (JP)

(73) Assignees: AISAN KOGYO KABUSHIKI KAISHA, Obu (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 17/514,671

(22) Filed: Oct. 29, 2021

(65) Prior Publication Data

US 2022/0136470 A1   May 5, 2022

(30) Foreign Application Priority Data

Oct. 30, 2020 (JP) .................. 2020-182123

(51) Int. Cl.
*F02M 37/00* (2006.01)
*F16L 3/00* (2006.01)
*B62D 25/08* (2006.01)

(52) U.S. Cl.
CPC ........ *F02M 37/0017* (2013.01); *B62D 25/082* (2013.01); *F16L 3/00* (2013.01)

(58) Field of Classification Search
CPC ..... F02M 37/0017; F16L 3/00; B62D 25/082; Y02T 90/40; Y02E 60/50; H01M 8/04201
See application file for complete search history.

(56) References Cited

U.S. PATENT DOCUMENTS

| 5,102,313 A * | 4/1992 | Szabo .................. F16L 37/144 |
| | | 285/305 |
| 5,735,247 A | 4/1998 | Tsuzuki et al. |
| 2008/0202472 A1 | 8/2008 | Whatley et al. |
| 2009/0107872 A1* | 4/2009 | Sakakibara ........ F02M 37/0017 |
| | | 206/524.1 |
| 2010/0040922 A1* | 2/2010 | Katano ............... F16K 31/0651 |
| | | 429/423 |
| 2010/0062319 A1* | 3/2010 | Katano ............. H01M 8/04097 |
| | | 429/411 |
| 2010/0209797 A1* | 8/2010 | Katano ............. H01M 8/04089 |
| | | 429/513 |
| 2010/0233561 A1* | 9/2010 | Katano ............. H01M 8/04089 |
| | | 429/443 |

(Continued)

FOREIGN PATENT DOCUMENTS

| JP | H09-291867 A | 11/1997 |
| JP | 2003322326 A * | 11/2003 |

(Continued)

OTHER PUBLICATIONS

Aug. 8, 2023 Office Action issued in Japanese Patent Application No. 2020-182123.

*Primary Examiner* — John M Zaleskas
(74) *Attorney, Agent, or Firm* — Oliff PLC

(57) ABSTRACT

A fuel supply apparatus to be mounted in a vehicle includes an injector, a rear delivery pipe and a front delivery pipe connected to the injector, and a fixed flange that is provided in the rear delivery pipe to fix the rear delivery pipe to a PCU. The fixed flange includes a cutout.

7 Claims, 27 Drawing Sheets

(56) References Cited

U.S. PATENT DOCUMENTS

| | | | |
|---|---|---|---|
| 2013/0174814 A1 | 7/2013 | Sugiyama | |
| 2014/0011109 A1* | 1/2014 | Katano | H01M 8/04201 |
| | | | 429/455 |
| 2014/0084627 A1* | 3/2014 | Yamanaka | B60L 3/04 |
| | | | 296/187.09 |
| 2016/0006050 A1* | 1/2016 | Nagata | F17D 5/02 |
| | | | 137/599.11 |
| 2016/0018035 A1* | 1/2016 | Seong | F16L 37/133 |
| | | | 285/34 |
| 2017/0018788 A1* | 1/2017 | Nagata | H01M 8/04089 |
| 2017/0101031 A1 | 4/2017 | Ohashi | |
| 2018/0257509 A1* | 9/2018 | Aishima | B60L 50/71 |
| 2020/0009971 A1* | 1/2020 | Yoshikawa | B60L 50/72 |

FOREIGN PATENT DOCUMENTS

| | | | | |
|---|---|---|---|---|
| JP | 2004036536 A | * | 2/2004 | F02M 55/005 |
| JP | 2005310718 A | * | 11/2005 | F02M 55/005 |
| JP | 2006-016986 A | | 1/2006 | |
| JP | 2013-139756 A | | 7/2013 | |
| JP | 2016-015271 A | | 1/2016 | |
| JP | 2017-025727 A | | 2/2017 | |
| JP | 2017-074819 A | | 4/2017 | |

* cited by examiner

FUEL SUPPLY APPARATUS

CROSS-REFERENCE TO RELATED APPLICATIONS

This application is based upon and claims the benefit of priority to Japanese Patent Application No. 2020-182123 filed on Oct. 30, 2020, the entire contents of which are incorporated herein.

BACKGROUND

Technical Field

The present disclosure related to a fuel supply apparatus to supply gas fuel to a fuel cell.

Related Art

Japanese unexamined patent application publication No. 2006-016986 (JP 2006-016986A) discloses a gas fuel supply structure configured such that a connection part between a fuel pipe to a regulator is placed in the space defined by leg parts and a protection member to protect the connection part when a vehicle is subjected to collision from the front.

SUMMARY

Technical Problems

As a fuel supply apparatus for supplying gas fuel to a fuel cell, there is a fuel supply apparatus having injectors for injecting fuel and a delivery pipe connected to the injectors. This fuel supply apparatus is mounted on a vehicle by for example fixing the delivery pipe to a component mounted in the vehicle. However, at the time of collision of the vehicle, the fuel supply apparatus may hit against for example a dash panel in the vehicle and, consequently, the delivery pipe may be deformed and the connection parts of the injectors joined to the delivery pipe may be deformed pipe, resulting in leakage of fuel from the fuel supply apparatus. Herein, JP 2006-016986A dot not disclose any countermeasure against fuel leakage in the fuel supply apparatus including the injectors and the delivery pipe as described above at the time of collision of a vehicle.

The present disclosure has been made to address the above problems and has a purpose to provide a fuel supply apparatus including injectors and a delivery pipe and being capable of preventing fuel leakage at the time of collision of a vehicle.

Means of Solving the Problems

To achieve the above-mentioned purpose, one aspect of the present disclosure provides a fuel supply apparatus to be mounted in a vehicle, the fuel supply apparatus comprising: an injector; a delivery pipe connected to the injector; and a fixed flange provided in the delivery pipe and configured to fix the delivery pipe to one of components of the vehicle, wherein the fixed flange includes a fragile portion.

According to the above configuration, at the time of vehicle collision, the fragile portion of the fixed flange is deformed before the delivery pipe is deformed or the connection part of the injector with the delivery pipe is deformed. Thus, the deformation of the delivery pipe and the deformation of the connected part of the injector with the delivery pipe can be prevented. This can prevent fuel leakage from the delivery pipe or the connected part of the injector with the delivery pipe. The fuel supply apparatus can consequently prevent fuel leakage at the time of vehicle collision.

According to the fuel supply apparatus of the present disclosure, the fuel supply apparatus including the injectors and the delivery pipe can prevent fuel leakage at the time of collision of a vehicle.

DETAILED DESCRIPTION OF THE EXEMPLARY EMBODIMENTS

A detailed description of an embodiment of a hydrogen supply apparatus 1, i.e., a hydrogen supply assembly, which is one aspect of a fuel supply apparatus of this disclosure will now be given referring to the accompanying drawings. A fuel cell system 101 incorporating the hydrogen supply apparatus 1 will be first described before the description of the hydrogen supply apparatus 1 in the present embodiment.
<Fuel Cell System>

Figure 1:
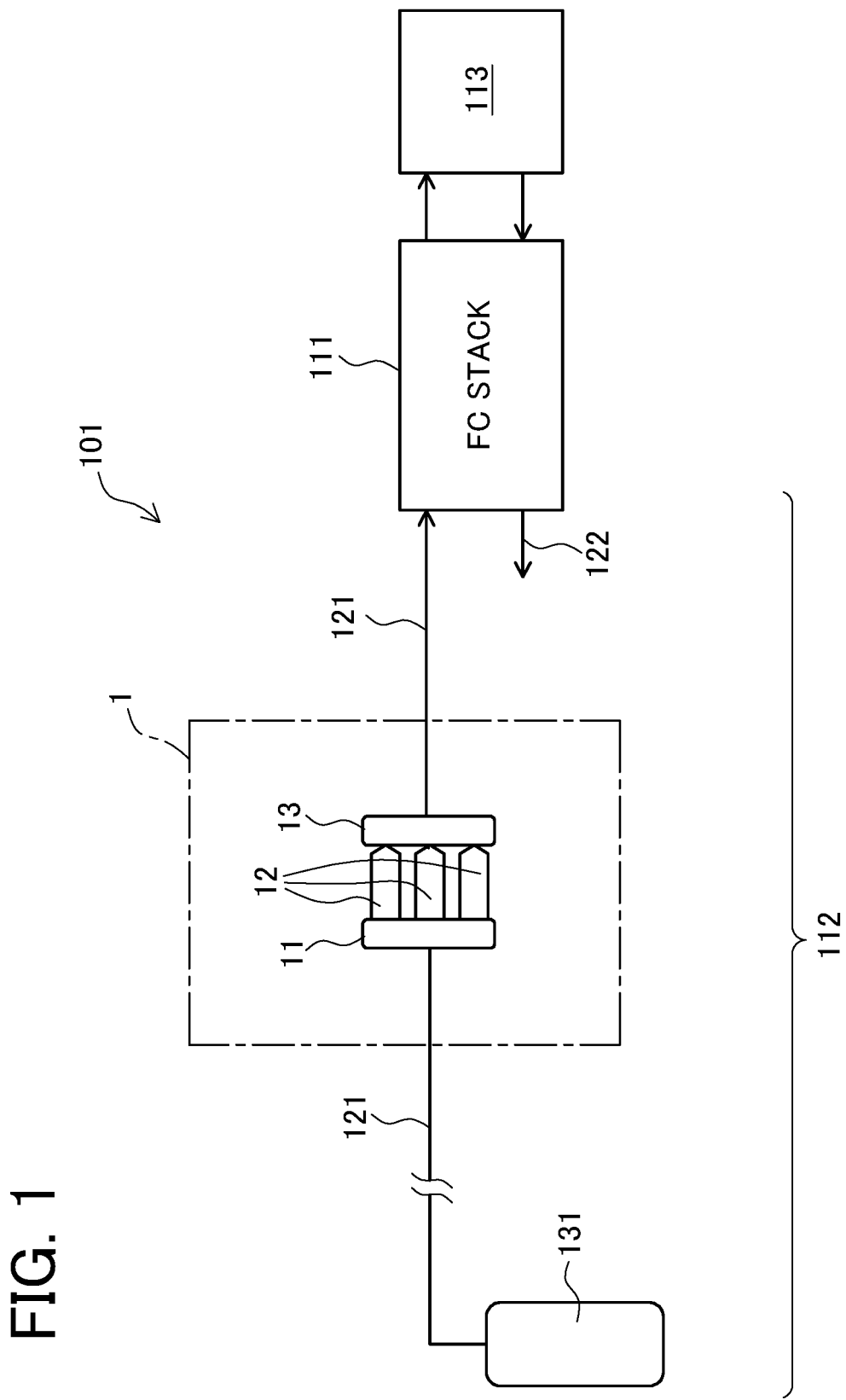
FIG. 1 is a schematic diagram of a fuel cell system including a hydrogen supply apparatus in an embodiment.

The fuel cell system 101 is mounted in a vehicle 100 (see FIG. 2) and, as shown in FIG. 1, includes a FC stack (fuel cells) 111, a hydrogen system unit 112, and an air system unit 113.

The hydrogen system unit 112 is provided with a hydrogen supply passage 121 and a hydrogen exhaust passage 122. The hydrogen supply passage 121 is a passage for supplying hydrogen gas, which is one example of a gas fuel, from a hydrogen tank 131 to the FC stack 111. The hydrogen exhaust passage 122 is a passage for exhausting hydrogen gas from the FC stack 111.

The hydrogen supply apparatus 1 of the present embodiment is placed on the hydrogen supply passage 121. This hydrogen supply apparatus 1 will be described in detail later.

In the fuel cell system 101 configured as above, the FC stack 111 generates electric power upon receiving supply of hydrogen gas from the hydrogen system unit 112 and supply of air from the air system unit 113. The electric power generated by the FC stack 111 is supplied to for example a drive motor (not shown) of the vehicle 100 through an inverter (not shown).
<Hydrogen Supply Apparatus>

The hydrogen supply apparatus 1 will be described below.

First Example

A first example of the hydrogen supply apparatus 1 will be first described.

Figure 2:
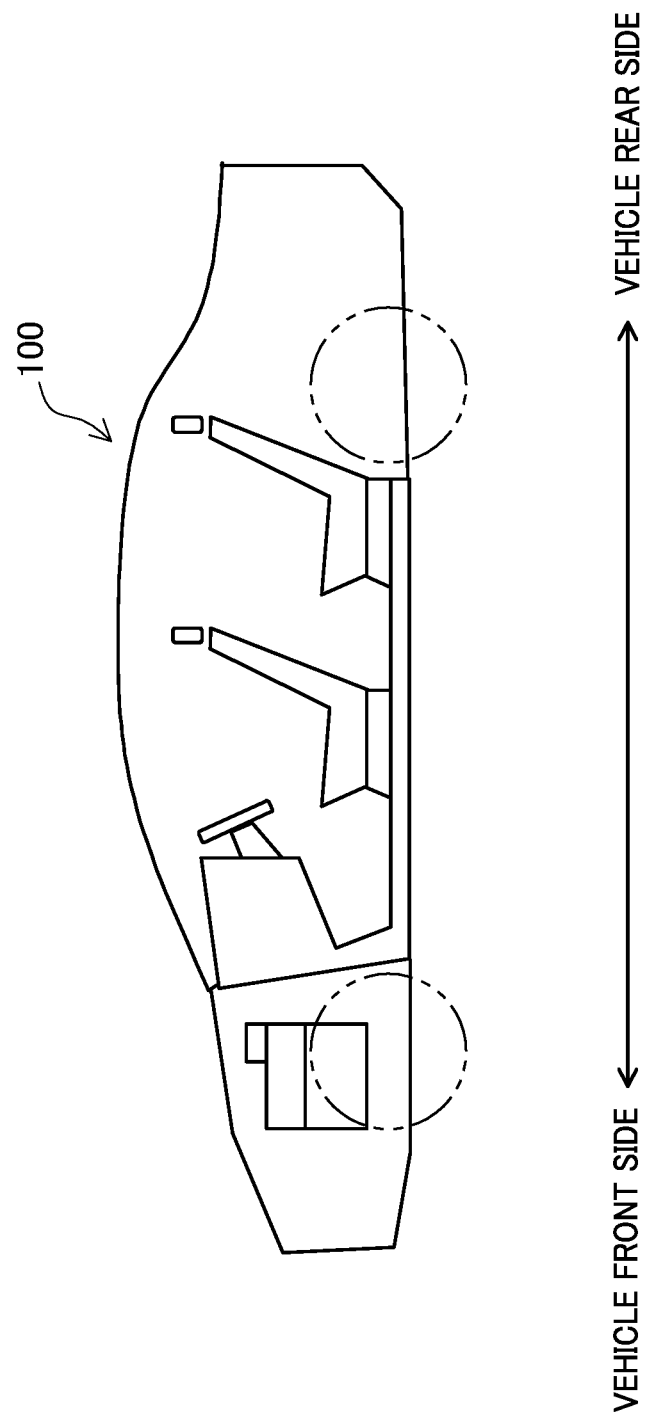
FIG. 2 is a schematic diagram of a vehicle in which the fuel cell system is mounted.
Figure 3:
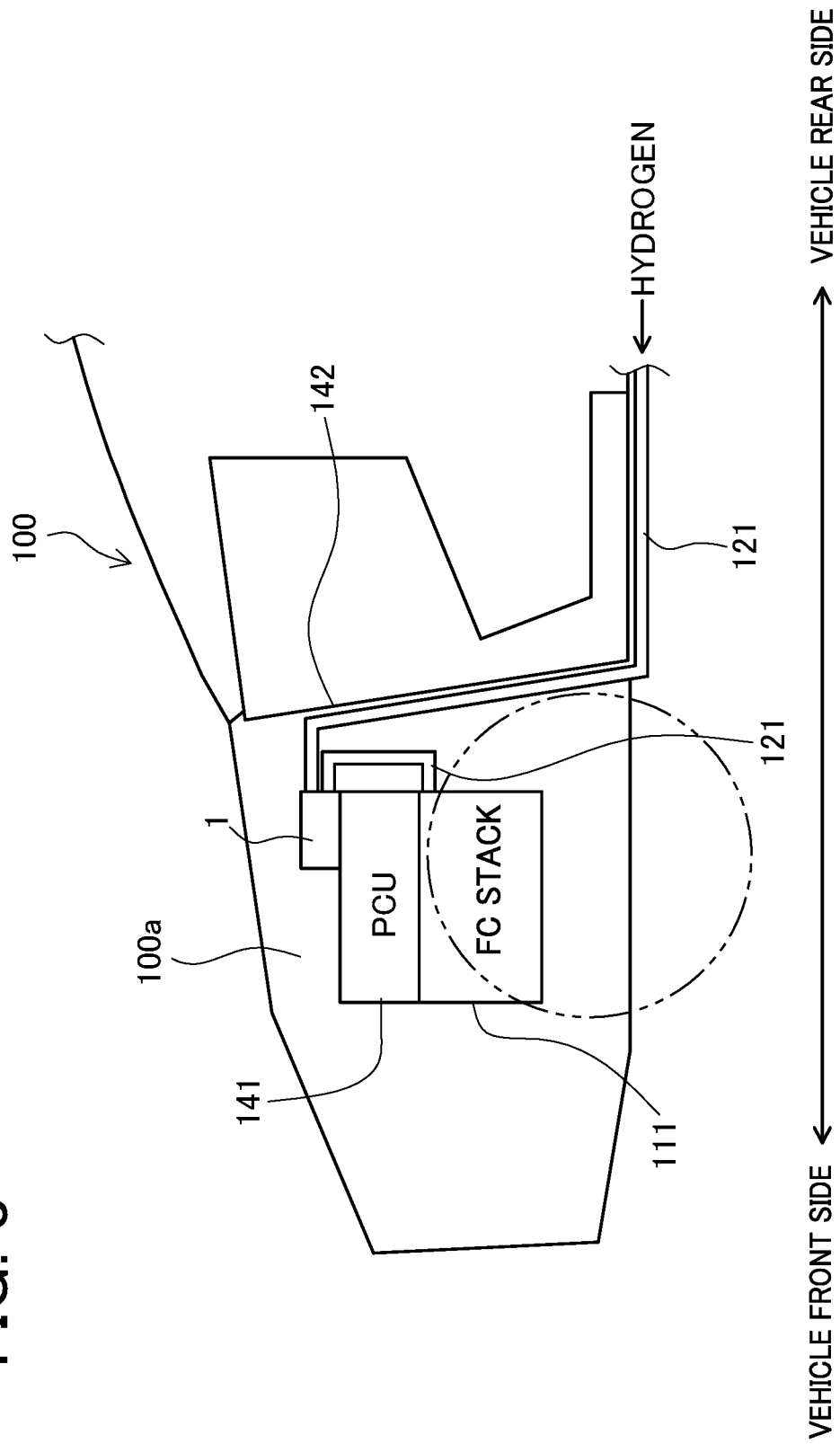
FIG. 3 is a schematic diagram of a front part of the vehicle in FIG. 2.

The hydrogen supply apparatus 1 is mounted on a PCU (power control unit) 141 placed on the FC stack 111 in an engine compartment 100a partitioned with a dash panel 142 from a cabin in the front of the vehicle 100 as shown in FIGS. 2 and 3. The PCU 141 is one example of one of components of the vehicle 100 in the present disclosure.

Figure 4:
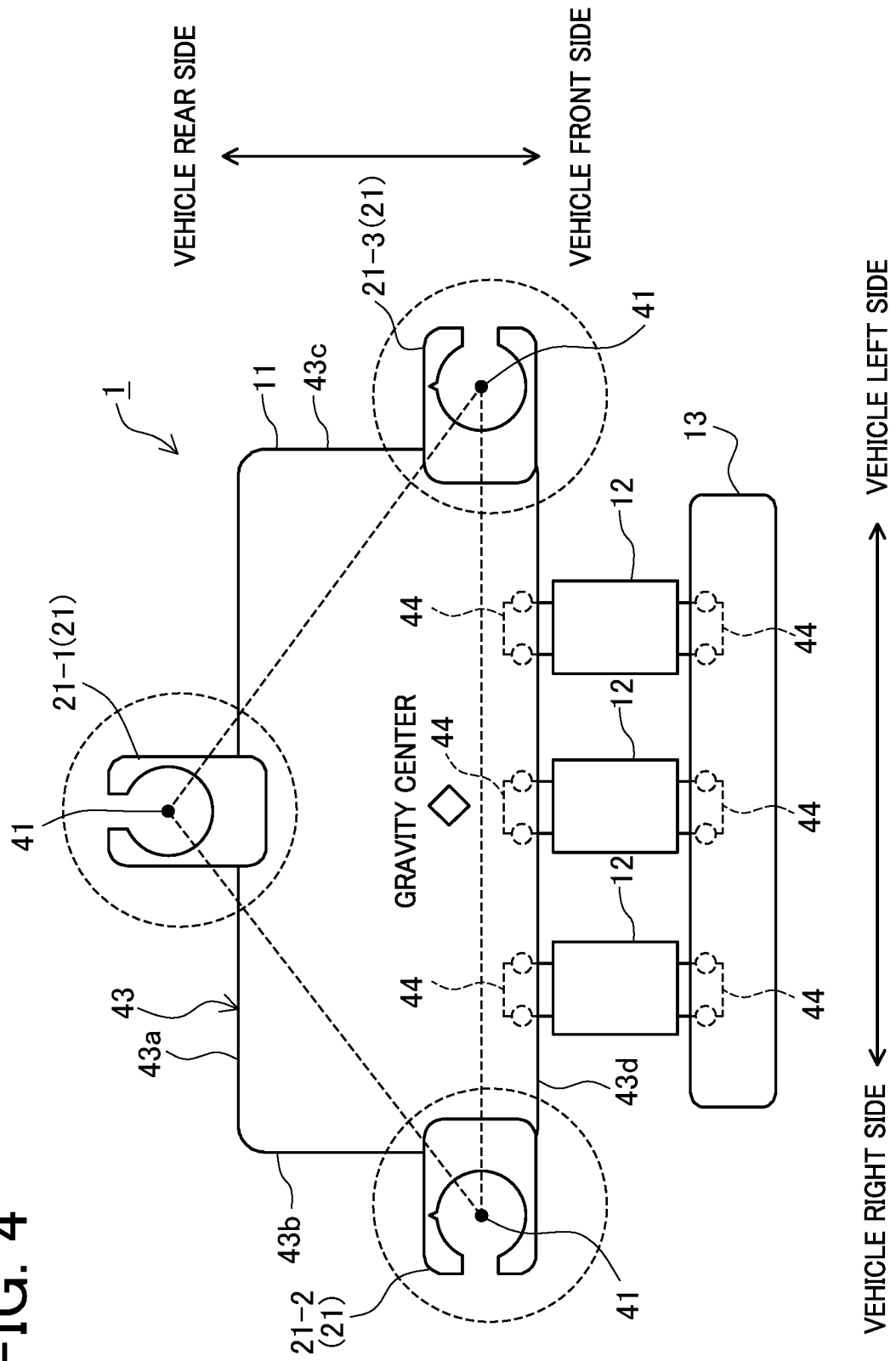
FIG. 4 is a configuration diagram of the hydrogen supply apparatus in a first example.

As shown in FIG. 4, the hydrogen supply apparatus 1 includes a rear delivery pipe 11, injectors 12, and a front delivery pipe 13.

The rear delivery pipe 11 is provided on the rear side of the vehicle 100 relative to the injectors 12. This rear delivery pipe 11 is configured to distribute hydrogen gas that is supplied from the hydrogen tank 131 (see FIG. 1) thereto through the hydrogen supply passage 121 (see FIGS. 1 and 3), to each of the injectors 12.

The injectors 12 are connected to the rear delivery pipe 11 and the front delivery pipe 13 while ensuring the fuel sealing performance by rod-shaped sealing parts 44 provided at both ends in the axial direction of each injector 12. In the example shown in FIG. 4, three injectors 12 are provided, but the number of injectors 12 provided in this apparatus 1 is not particularly limited thereto. The injectors 12 are oriented so that their axes extend in the front-rear direction of the vehicle 100, that is, the axial direction of each injector 12 coincides with the front-rear direction of the vehicle 100. Then, these injectors 12 are operated to inject hydrogen gas from the rear delivery pipe 11 to the front delivery pipe 13 while adjusting a flow rate and a pressure of the hydrogen gas to be supplied to the front delivery pipe 13.

The front delivery pipe 13 is provided in the front of the vehicle 100 relative to the injectors 12. In the front delivery pipe 13, hydrogen gas streams supplied from the injectors 12 merge with each other.

In the present example, as shown in FIG. 4, in the rear delivery pipe 11, three fixed flanges 21 including a rear flange 21-1, a right flange 21-2, and a left flange 21-3 are provided. These fixed flanges 21 are used to fix the rear delivery pipe 11 (the hydrogen supply apparatus 1) to the PCU 141.

The rear flange 21-1 is placed in the rear delivery pipe 11 at a position on the rear side of the vehicle 100, i.e., on a "vehicle rear side" indicated in the figures. The right flange 21-2 is placed in the rear delivery pipe 11 at a position on the right side of the vehicle 100, i.e., on a "vehicle right side" indicated in the figures. The left flange 21-3 is placed in the rear delivery pipe 11 at a position on the left side of the vehicle 100, i.e., on a "vehicle left side" indicated in the figures. It is to be noted that the vehicle front side, vehicle rear side, vehicle right side, and vehicle left side in the present example are defined as indicated in the figures, which respectively correspond to the front, rear, right, and left positions when viewed forward from a driver's seat of the vehicle 100.

Figure 5:
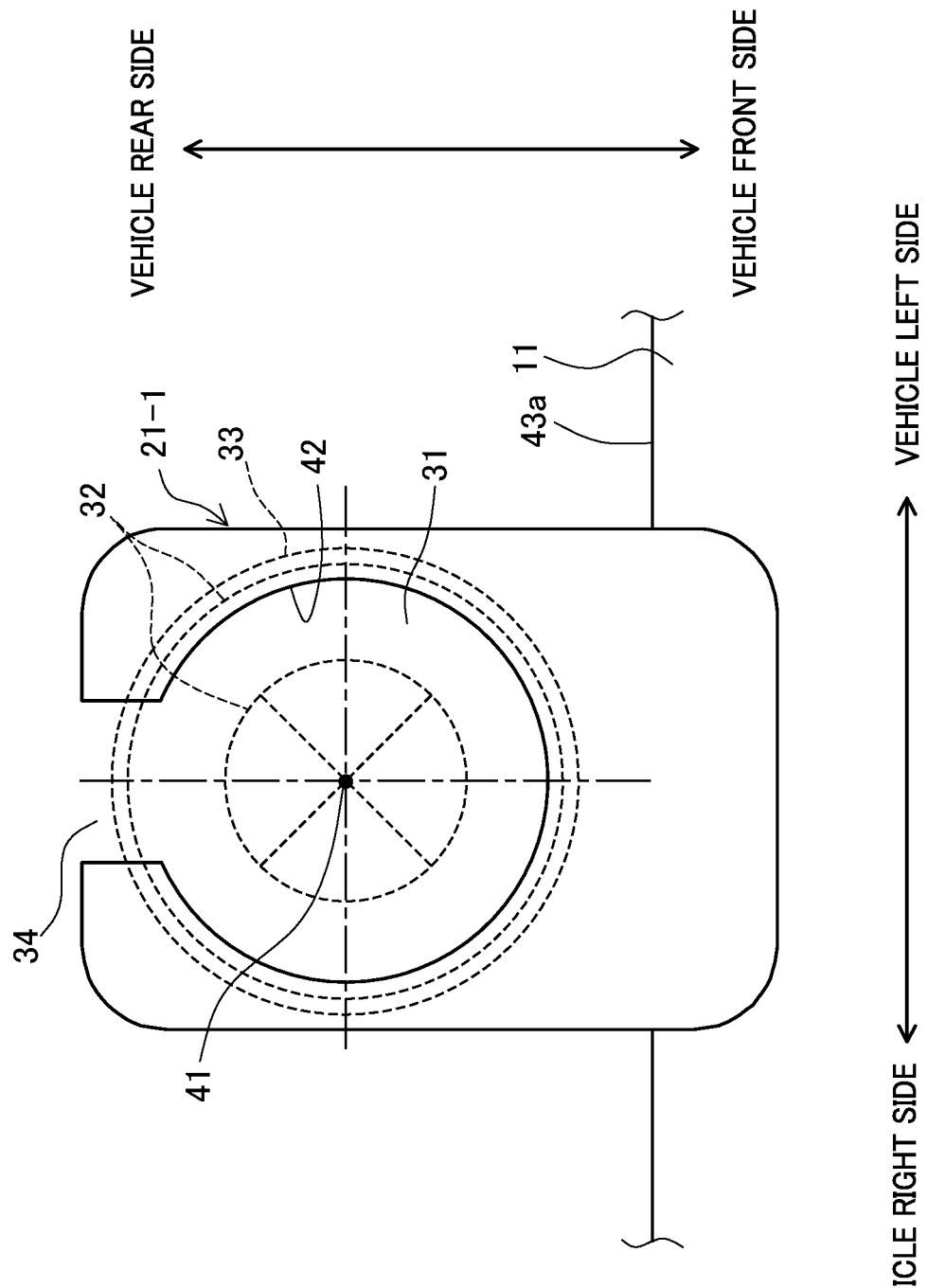
FIG. 5 is an enlarged view of a rear flange and surrounding parts thereof.
Figure 6:
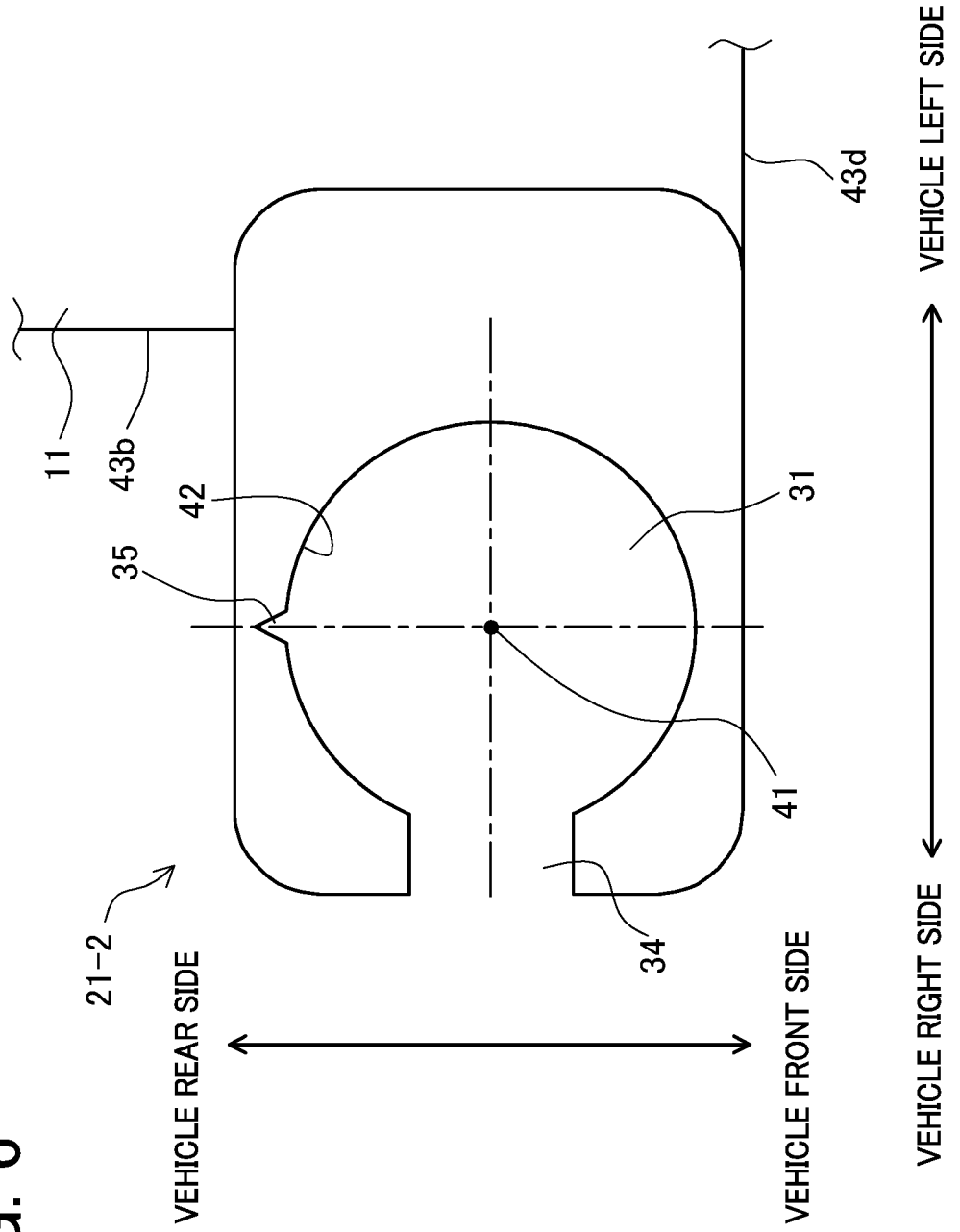
FIG. 6 is an enlarged view of a right flange and surrounding parts thereof.
Figure 7:
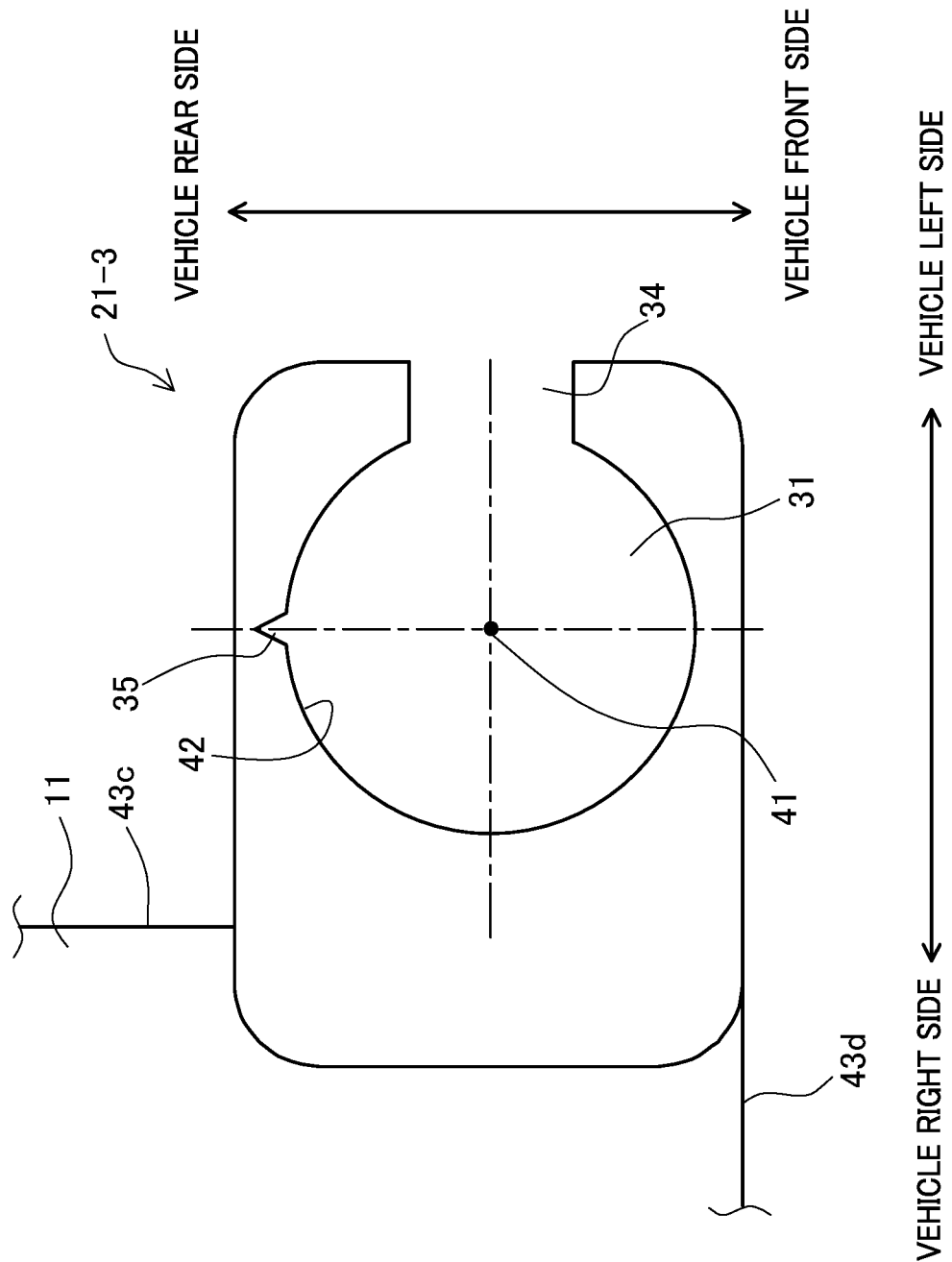
FIG. 7 is an enlarged view of a left flange and surrounding parts thereof.

Each of the fixed flanges 21 includes a hole part 31 for insertion of a bolt 32, as shown FIGS. 5 to 7. With the bolts 32 inserted in the hole parts 31 of the fixed flanges 21, the rear delivery pipe 11 is fastened to the PCU 141 (see FIG. 3), so that the hydrogen supply apparatus 1 is fixed to the PCU 141. The bolts 32 are one example of a fastening member of the present disclosure.

Specifically, for example, as shown in FIG. 5, a grommet 33, which is a disk-shaped rubber member, is attached to the hole part 31 of each fixed flange 21 (herein, the rear flange 21-1 is illustrated as one example). Further, the bolt 32 is inserted into a hole of the grommet 33, and then the bolt 32 is tightened into the PCU 141 to fix the rear delivery pipe 11 (the hydrogen supply apparatus 1) to the PCU 141. In the figures described below including FIG. 4, for convenience of explanation, the bolts 32 and the grommets 33 in the fixed flanges 21 are not illustrated appropriately.

As shown in FIGS. 5 to 7, when each fixed flange 21 is viewed along the central axis of the hole part 31, that is, the axis extending through the center 41 in the front and depth directions of the drawing sheet (i.e., in a perpendicular direction to the drawing sheet), each fixed flange 21 has for example a substantially C-shape. Further, when the fixed flange 21 is viewed along the central axis of the hole part 31, the fixed flange 21 has an inner wall surface 42 defining the outer shape of the hole part 31 and having a substantially circular shape.

The three fixed flanges 21 including the above rear flange 21-1, right flange 21-2, and left flange 21-3 are each provided with a hole part 31 and a gap 34 as shown in FIGS. 5 to 7. The hole part 31 is a hole for insertion of the bolt 32 and the grommet 33. The gap 34 is designed to allow the hole part 31 to communicate with the outside of the fixed flange 21.

Further, as shown in FIG. 4, the three fixed flanges 21 are arranged so that the center of gravity (indicated by a square mark in the figures) of the hydrogen supply apparatus 1, which is a group of components including the rear delivery pipe 11, the injectors 12, the front delivery pipe 13, and the three fixed flanges 21, is positioned within a triangular shape (indicated by a broken line in FIG. 4) whose apexes are located at the centers 41 of the hole parts 31 of the fixed flanges 21.

Specifically, in the rear delivery pipe 11, the rear flange 21-1 is placed in a rear part 43a of an outer surface 43 located on the rear side of the vehicle 100 so as to be at the center position in the right-left direction of the vehicle 100. The rear flange 21-1 is oriented so that the gap 34 is located on the rear side of the vehicle 100, namely, opens rearward.

Further, in the rear delivery pipe 11, the right flange 21-2 is placed in a right part 43b of the outer surface 43 located on the right side of the vehicle 100 so as to be at a position on the front side of the vehicle 100. The right flange 21-2 is oriented so that the gap 34 is located on the right side of the vehicle 100, namely, opens rightwards.

Further, in the rear delivery pipe 11, the left flange 21-3 is placed in a left part 43c of the outer surface 43 located on the left side of the vehicle 100 so as to be at a position on the front side of the vehicle 100. The left flange 21-3 is oriented so that the gap 34 is located on the left side of the vehicle 100, namely, opens leftwards.

From the viewpoint of easy production, it is preferable that the fixed flanges 21 are located at the same height in the engine compartment 100a. However, considering the mounting easiness of the hydrogen supply apparatus 1 onto the PCU 141, the heights of the fixed flanges 21 do not have to be the same.

In the present example, as shown in FIGS. 6 and 7, the right flange 21-2 and the left flange 21-3 are each provided with a cutout 35, which is a groove formed in the inner wall surface 42 defining the hole part 31.

This cutout 35 is provided at a position on the rear side of the vehicle 100 relative to the center 41 of the hole part 31 in which the bolt 32 is inserted. In the example shown in FIGS. 6 and 7, the cutout 35 is located at a position on the center line passing through the center 41 of the hole part 31, but is not limited to this position. The cutout 35 may be located at any position as long as it is located on the rear side of the vehicle 100. The cutout 35 is one example of a fragile portion of the present disclosure.

Further, the cutout 35 is arranged at a position more outside than the outer surface 43 of the rear delivery pipe 11 in the right-left direction of the vehicle 100 as shown in FIGS. 6 and 7.

Furthermore, the strength of the cutout 35 is determined so as to satisfy the following conditional expression:

(Strength of the dash panel 142 of the vehicle 100)<
(Strength of the cutout 35)<(Force received by vibration of the vehicle 100).

Figure 8:
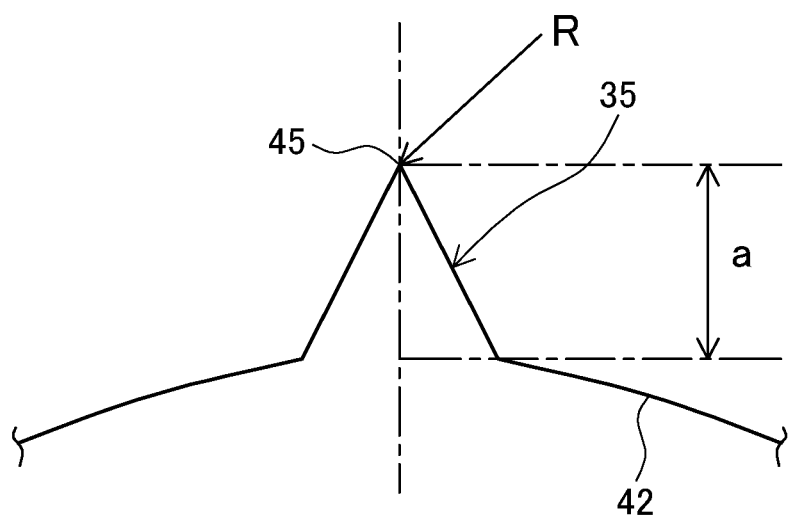
FIG. 8 is an explanatory diagram showing a curvature of a tip of a cutout and a cutout depth of the cutout.

At this time, the strength of the cutout 35 is adjusted in consideration of the stress concentration coefficient α (a coefficient representing the magnitude of stress that can be generated in the cutout 35 of the fixed flange 21) expressed by the following formula:

$$\alpha = 1 + 2\sqrt{(a/R)}$$

in which R denotes the curvature of the tip 45 of the cutout 35 and a denotes the cutout depth of the cutout 35, as shown in FIG. 8.

Figure 9:
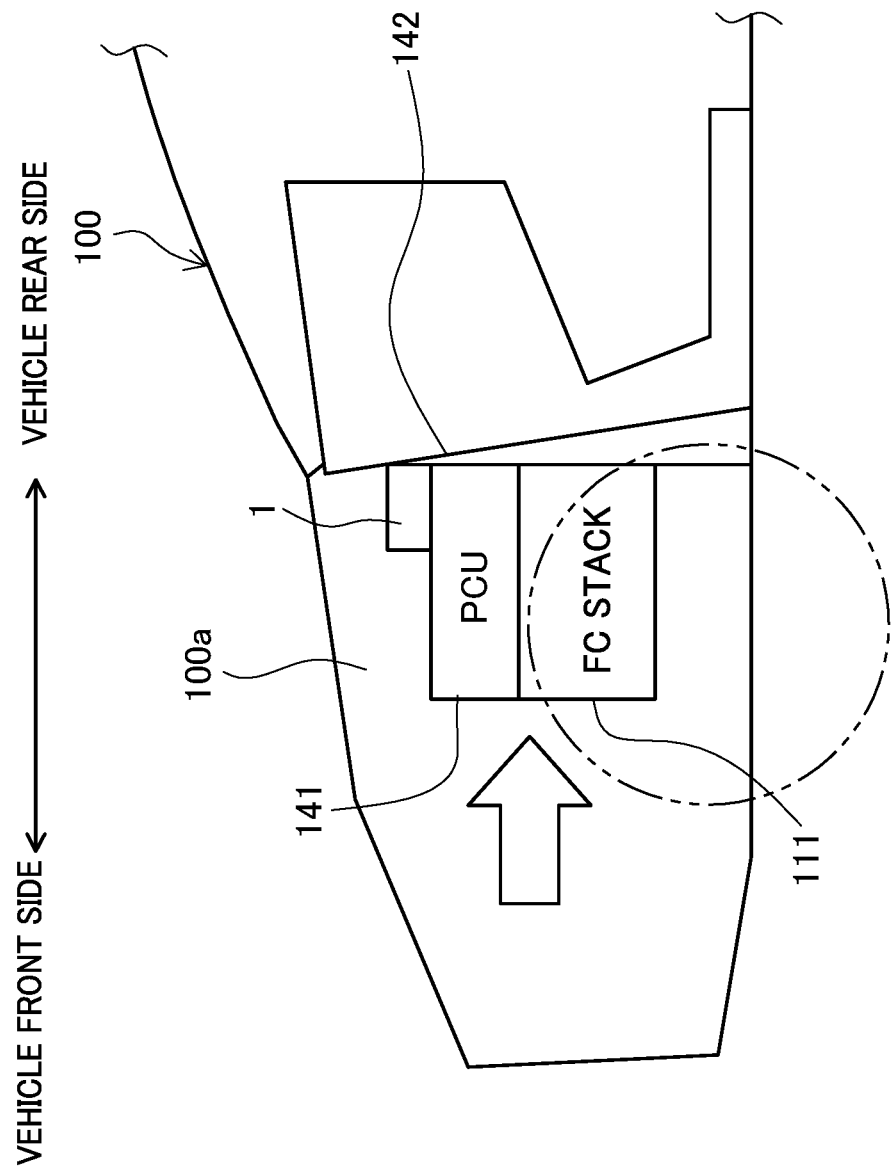
FIG. 9 is a diagram showing that the hydrogen supply apparatus hits against a dash panel.

Herein, the following case is assumed: the hydrogen supply apparatus 1 moves backward in the vehicle 100 together with the FC stack 111 and the PCU 141 and hits against the dash panel 142 at the time of front collision of the vehicle 100, as shown in FIG. 9.

Figure 27:
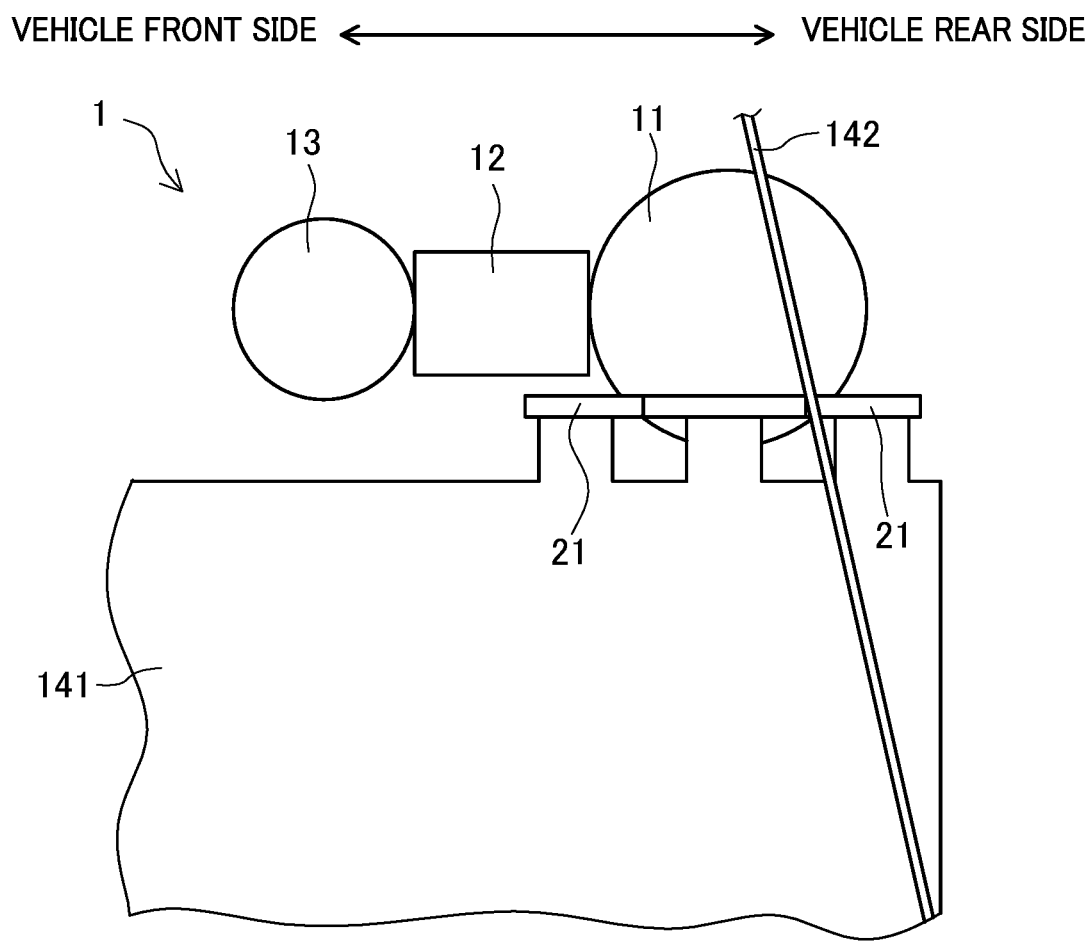
FIG. 27 is a diagram showing that a hydrogen supply apparatus remains fixed to a PCT at the time of vehicle front collision.

At this time, if the hydrogen supply apparatus 1 remains fixed to the PCU 141, the main body of the rear delivery pipe 11 strongly strikes on the dash panel 142. In some cases, for example, the rear delivery pipe 11 may penetrate through the dash panel 142 as shown in FIG. 27, so that the rear delivery pipe 11 may be deformed by a large impact or the rod-shaped sealing parts 44 of the injectors 12 may be deformed by a large impact. This may cause hydrogen leakage from the rear delivery pipe 11 or the rod-shaped sealing parts 44 of the injectors 12.

Figure 10:
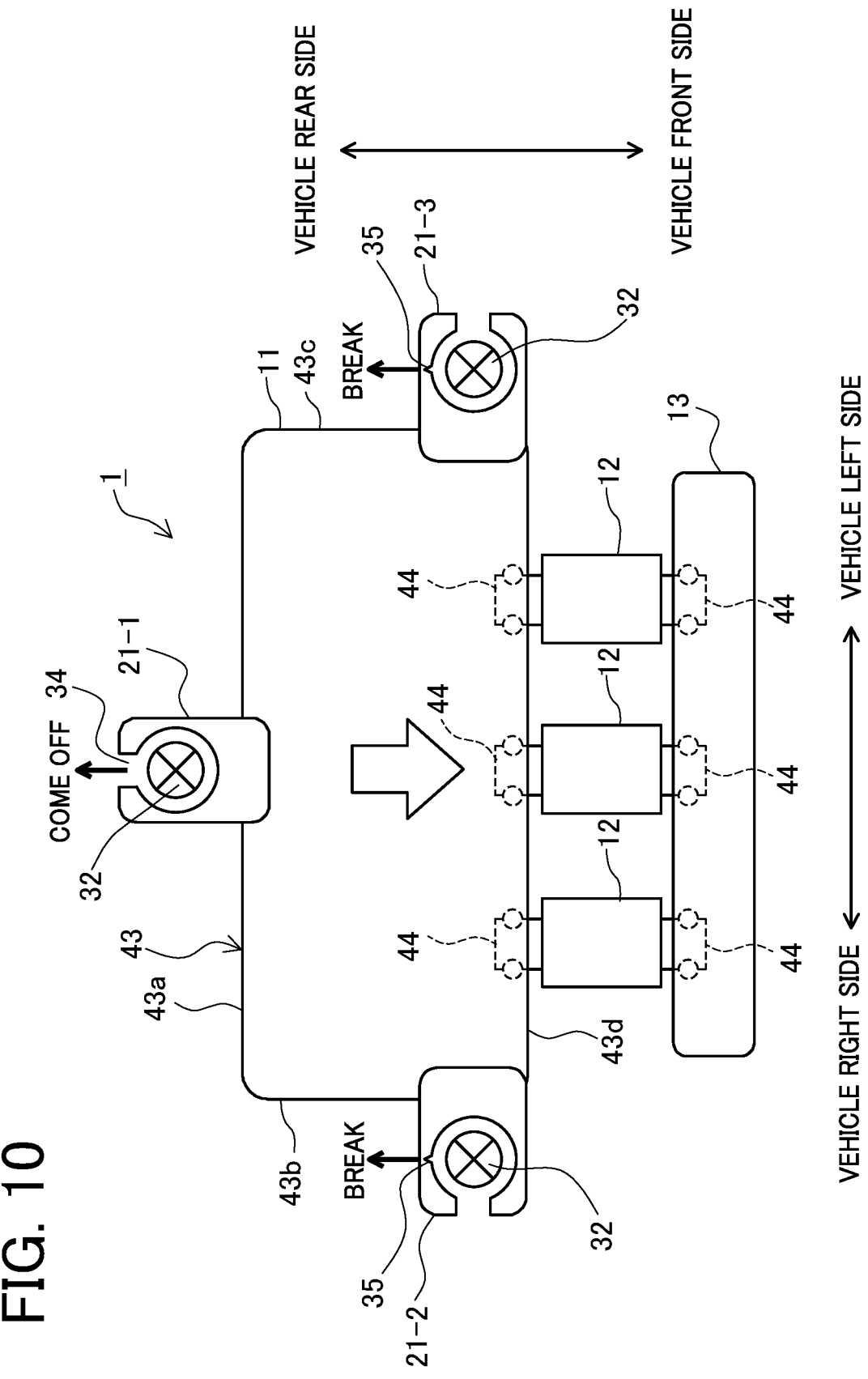
FIG. 10 is a diagram showing operations at the time of vehicle front collision, in which the vehicle collides from the front.

In contrast, in the present example, the right flange 21-2 and the left flange 21-3 each include the cutout 35, which is a fragile portion. Thus, for example, at the time of front collision of the vehicle 100, when the vehicle 100 collides from the front, as shown in FIG. 10, the hydrogen supply apparatus 1 receives a force acting in a forward direction of the vehicle 100. Thus, in each of the right flange 21-2 and the left flange 21-3, the bolt 32 hits the cutout 35, which is a fragile portion, so that the cutout 35 itself or a peripheral portion thereof breaks starting from the cutout 35. Further, the bolt 32 comes off, or disengages, from the rear flange 21-1 through the gap 34 of the rear flange 21-1.

Figure 11:
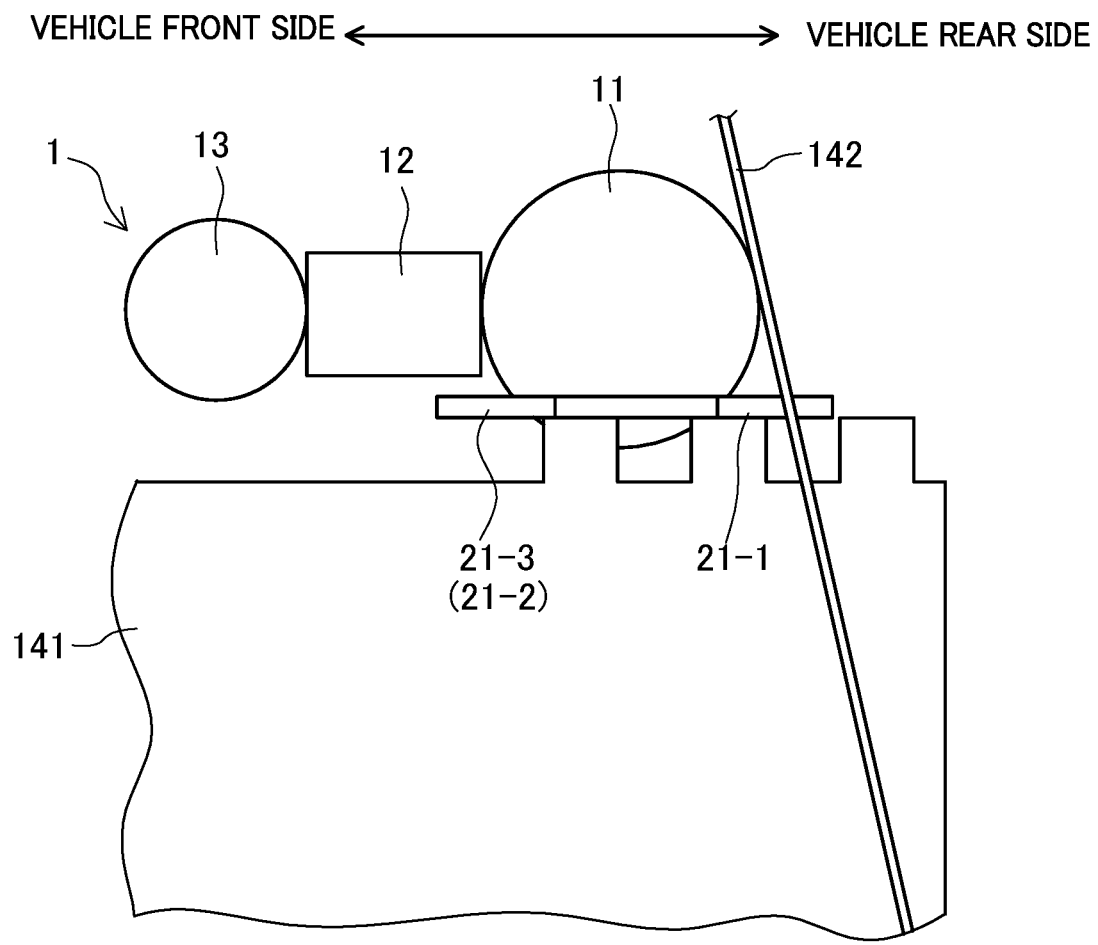
FIG. 11 is a diagram showing that the hydrogen supply apparatus is separated from a PCU at the time of vehicle front collision.

Then, as shown in FIG. 11, the hydrogen supply apparatus 1 is disconnected, or separated, from the PCU 141 and thus allowed to move toward the front of the vehicle 100, so that the collision of the rear delivery pipe 11 against the dash panel 142 is reduced. Thus, the deformation of the rear delivery pipe 11 and the deformation of the rod-shaped sealing part 44 of each injector 12 can be suppressed. This configuration can prevent hydrogen leakage from the rear delivery pipe 11 and the rod-shaped sealing parts 44 of the injectors 12. Accordingly, hydrogen leakage from the hydrogen supply apparatus 1 at the time of front collision of the vehicle 100 can be suppressed.

In addition, at the time of front collision of the vehicle 100, even when the vehicle 100 collides from the oblique right or left, the hydrogen supply apparatus 1 is separated from the PCU 141 as shown in FIG. 11 in a similar manner to when the vehicle 100 collides from the front. Accordingly, hydrogen leakage from the rear delivery pipe 11 and the rod-shaped sealing parts 44 of the injectors 12 can be prevented.

Figure 12:
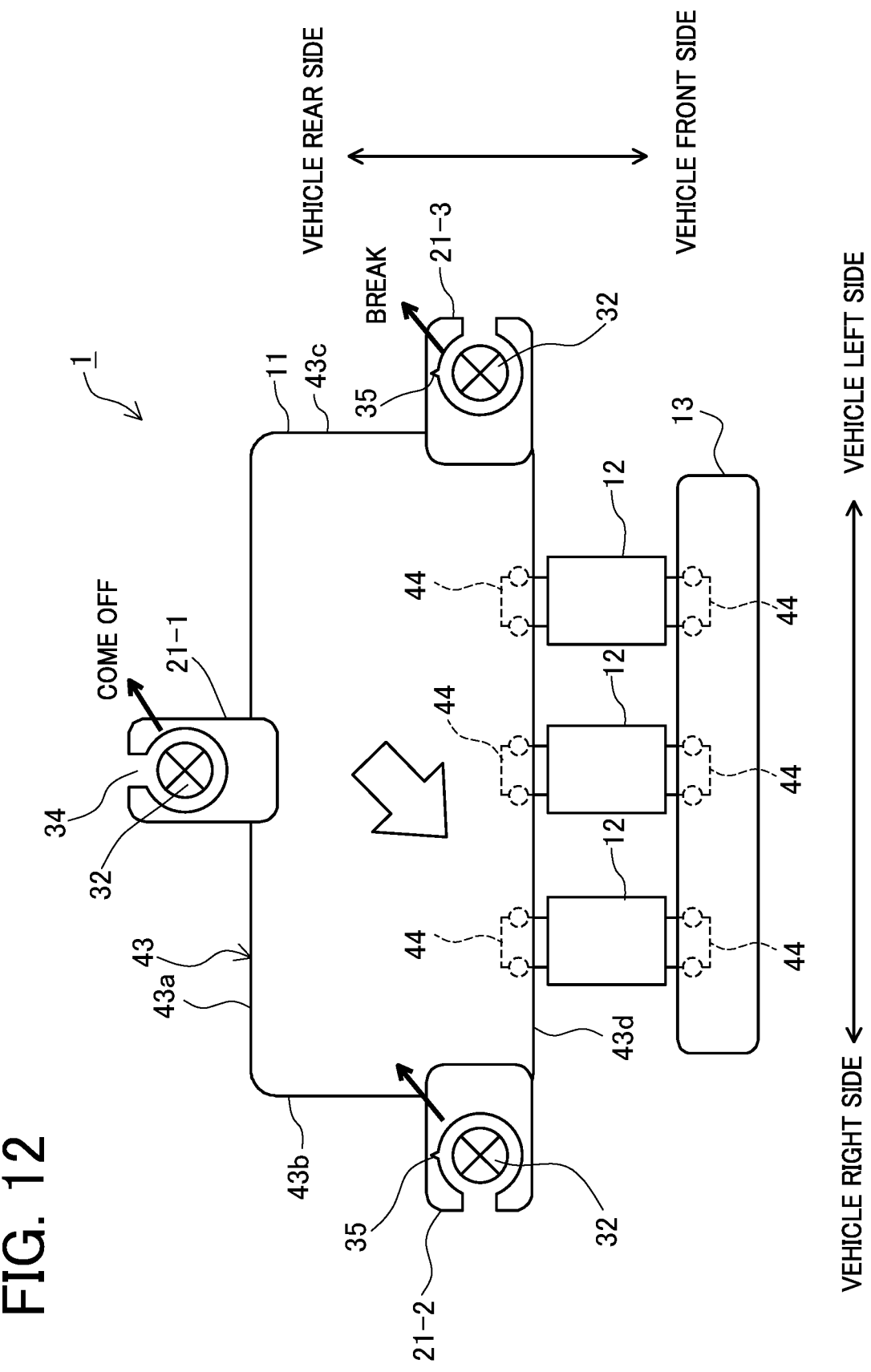
FIG. 12 is a diagram showing operations at the time of vehicle front collision, in which the vehicle collides from the oblique right.

Specifically, for example, at the time of front collision of the vehicle 100, when the vehicle 100 collides from the oblique right, a force acts on the hydrogen supply apparatus 1 in the obliquely right direction of the vehicle 100 as shown in FIG. 12. Then, in the left flange 21-3, the bolt 32 hits the cutout 35, which is the fragile portion, so that the cutout 35 or a peripheral portion thereof breaks or fractures starting from this cutout 35. This enables the hydrogen supply apparatus 1 to turn, thereby causing the bolt 32 inserted in the rear flange 21-1 to come off from the rear flange 21-1 through the gap 34 thereof. Then, as shown in FIG. 11, the hydrogen supply apparatus 1 is separated from the PCU 141 and further moves forward in the vehicle 100.

Figure 13:
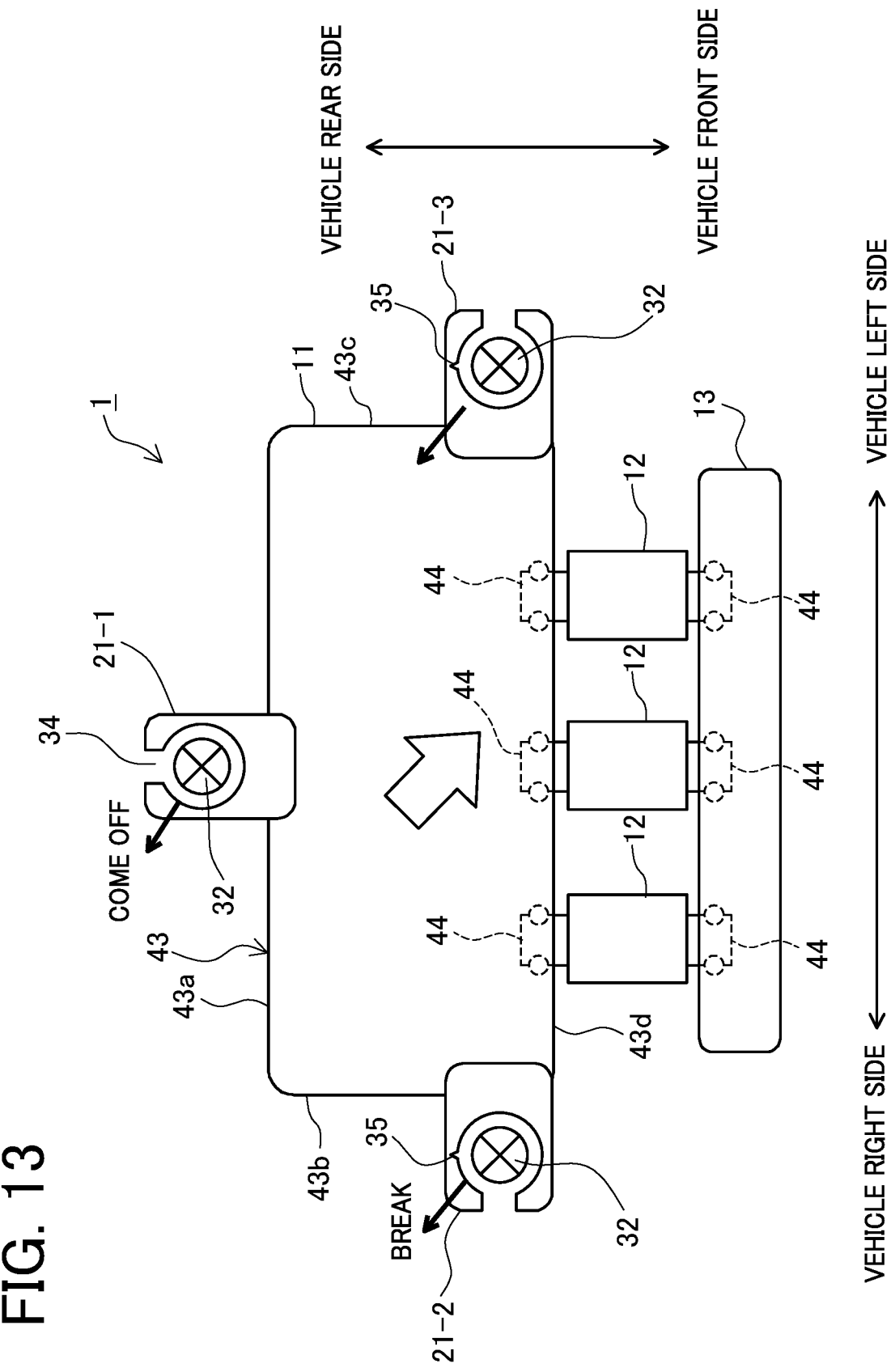
FIG. 13 is a diagram showing operations at the time of vehicle front collision, in which the vehicle collides from the oblique left.

Furthermore, for example, at the time of front collision of the vehicle 100, when the vehicle 100 collides from the oblique left, as shown in FIG. 13, a force acts on the hydrogen supply apparatus 1 in the obliquely left direction of the vehicle 100. Then, in the right flange 21-2, the bolt 32 hits the cutout 35, which is the fragile portion, so that the cutout 35 or a peripheral portion thereof breaks or fractures starting from this cutout 35. This enables the hydrogen supply apparatus 1 to turn, thereby causing the bolt 32 inserted in the rear flange 21-1 to come off from the rear flange 21-1 through the gap 34 thereof. Then, as shown in FIG. 11, the hydrogen supply apparatus 1 is separated from the PCU 141 and further moves forward in the vehicle 100.

Figure 14:
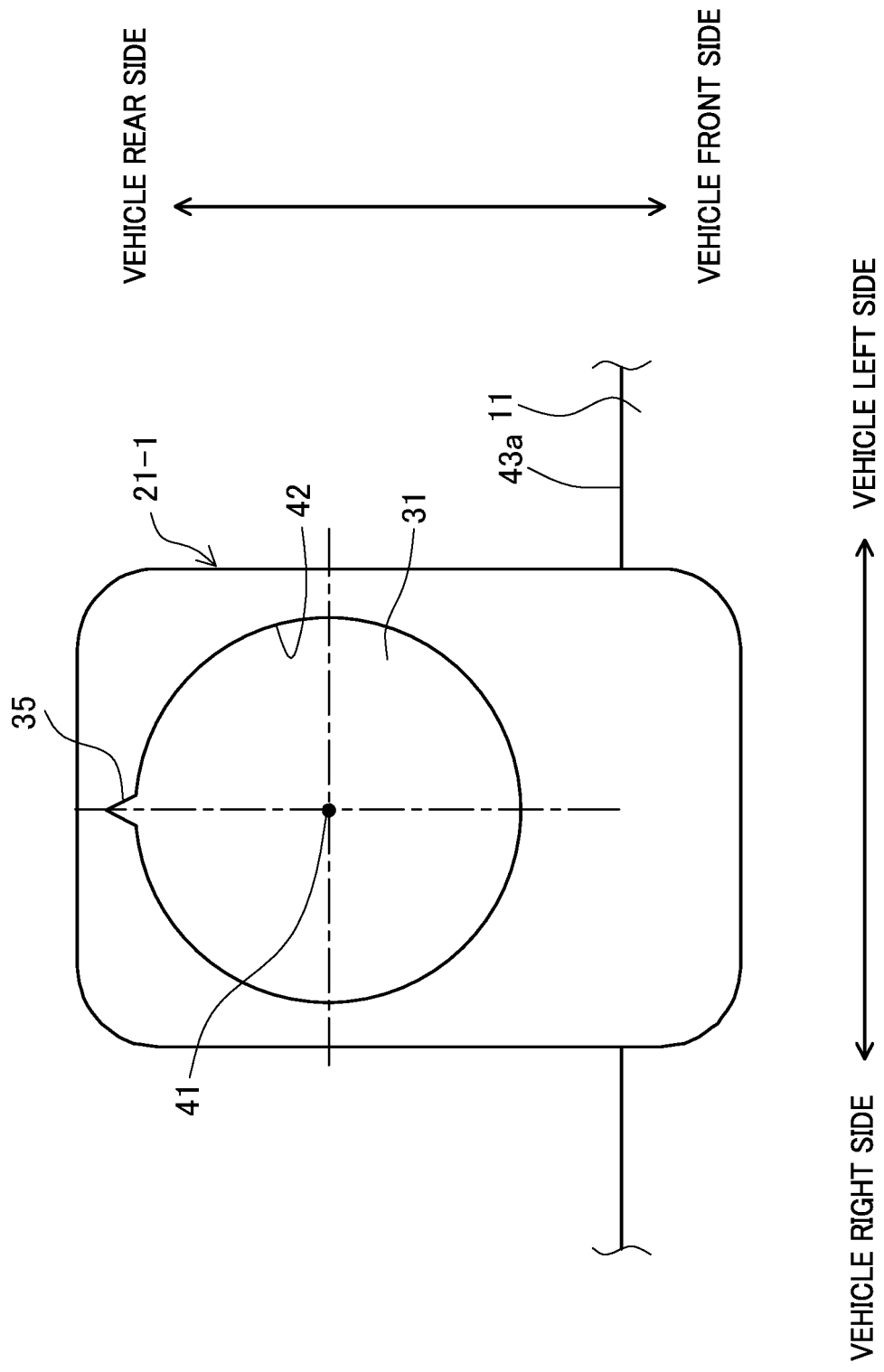
FIG. 14 is an enlarged view of a rear flange and surrounding parts thereof in a modified example of the first example.
Figure 15:
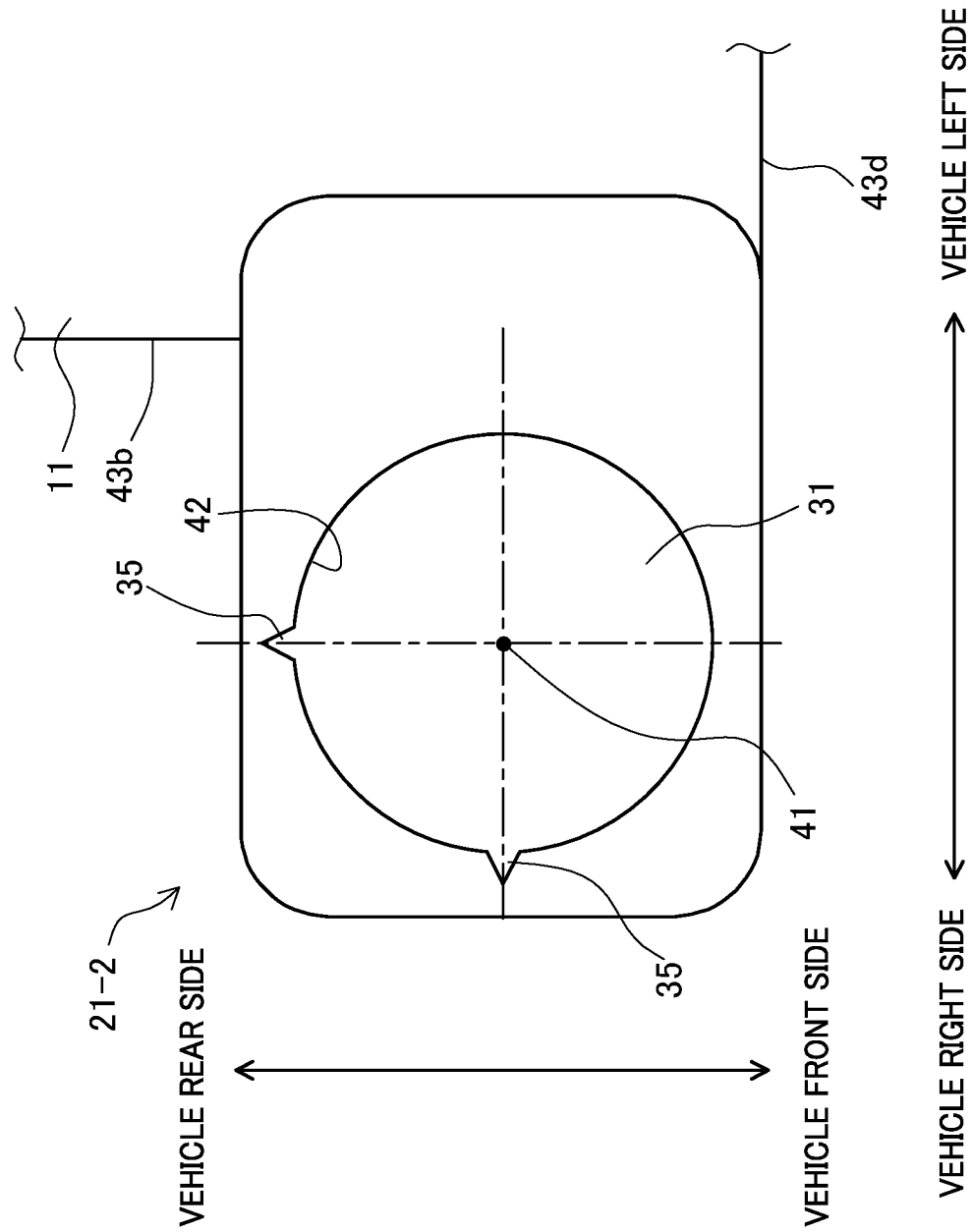
FIG. 15 is an enlarged view of a right flange and surrounding parts thereof in a modified example of the first example.
Figure 16:
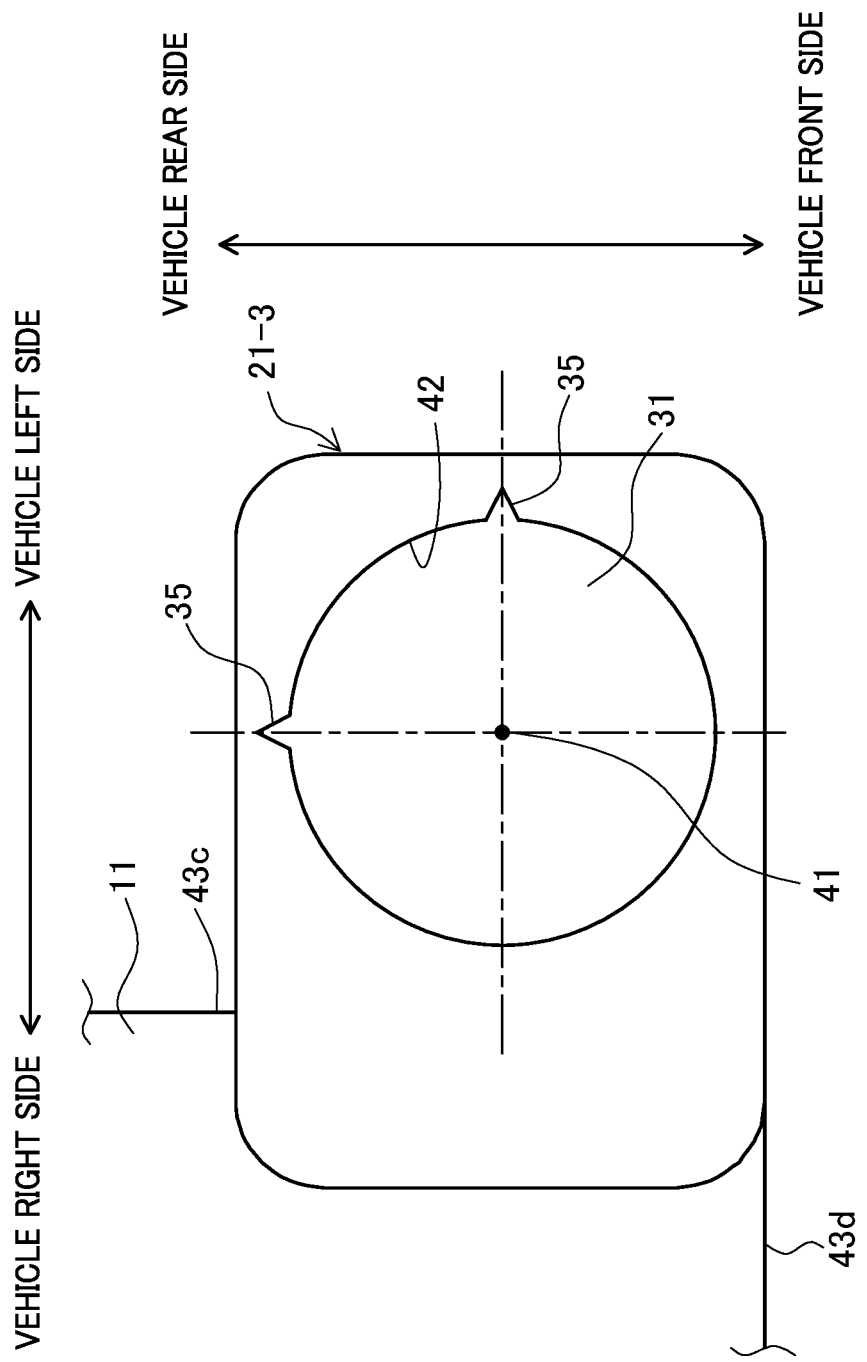
FIG. 16 is an enlarged view of a left flange and surrounding parts thereof in a modified example of the first example.

As a modified example, as shown in FIGS. 14 to 16, the fixed flange 21 may have a substantially O-shape when viewed along the central axis of the hole part 31.

In this modified example, as shown in FIG. 14, the rear flange 21-1 is provided with the cutout 35 instead of the gap 34 at a position on the rear side of the vehicle 100 relative to the center 41 of the hole part 31. Accordingly, at the front collision of the vehicle 100, the bolt 32 in the rear flange 21-1 hits the cutout 35, which is the fragile portion, so that the cutout 35 or a peripheral portion thereof breaks starting from the cutout 35.

Furthermore, as shown in FIG. 15, the right flange 21-2 is provided with cutouts 35 at positions on the rear and right sides of the vehicle 100 relative to the center 41 of the hole part 31. Further, as shown in FIG. 16, the left flange 21-3 is provided with cutouts 35 at positions on the rear and left sides of the vehicle 100 relative to the center 41 of the hole part 31.

The shape of the fixed flange 21 is selected according to the required strength. For example, since the substantial O-shape can have higher strength than the substantial C-shape, it is therefore conceivable to adopt the substantial O-shape if the high strength is required.

Operations and Effects of First Example

According to the hydrogen supply apparatus 1 configured as above in the first example, each fixed flange 21 is provided with the cutout or cutouts 35.

Accordingly, at the time of front collision of the vehicle 100, the cutout or cutouts 35 of the corresponding fixed flange 21 is deformed before the rear delivery pipe 11 is deformed or the rod-shaped sealing part(s) 44 of the injector(s) 12 is deformed. This configuration can suppress deformation of the rear delivery pipe 11 and the deformation of the rod-shaped sealing part(s) 44 of the injector(s) 12, thus preventing hydrogen leakage from the rear delivery pipe 11 and the rod-shaped sealing part(s) 44 of the injector(s) 12. In the hydrogen supply apparatus 1, consequently, hydrogen leakage can be prevented at the time of front collision of the vehicle 100.

The cutouts 35 are located at least on the rear side of the vehicle 100 relative to the center 41 of the hole part 31.

Accordingly, at the time of front collision of the vehicle 100, when the hydrogen supply apparatus 1 is subjected to impact from the front of the vehicle 100, the cutout(s) 35 located at a position on the rear side of the vehicle 100 is easily deformed. This configuration can more effectively prevent the deformation of the rear delivery pipe 11 and the deformation of the rod-shaped sealing part(s) 44 of the injector(s) 12 when the vehicle 100 collides from the front.

The cutout or cutouts 35 are arranged at more outside positions than the outer surface 43 of the rear delivery pipe 11 in the right-left direction of the vehicle 100.

Accordingly, it is possible to prevent the deformation of the cutout(s) 35 from being interfered by the rear delivery pipe 11 at the time of front collision of the vehicle 100. This configuration can more reliably deform the cutout(s) 35 to prevent the deformation of the rear delivery pipe 11 and the deformation of the rod-shaped sealing part(s) 44 of the injector(s) 12 when the vehicle 100 collides from the front.

Further, each cutout 35 is a cutout formed in the corresponding inner wall surface 42 defining the hole part 31.

Such a cutout 35 has only to be formed with a simple structure by making a cutout in the desired inner wall surface 42 defining the hole part 31. Thus, a manufacturing cost can be reduced.

The three fixed flanges 21 are arranged so that the position of the gravity center of the hydrogen supply apparatus 1 is positioned within a triangular shape whose apexes are located at the centers 41 of the hole parts 31 of the three fixed flanges 21.

This makes it possible to prevent the gravity center of the hydrogen supply apparatus 1 from deviating excessively. At the time of front collision of the vehicle 100, it is therefore possible to prevent the acting direction of the impact on the rod-shaped sealing parts 44 of the injectors 12 from significantly deviating from the axis of each corresponding injector 12, thus reducing deformation of the rod-shaped sealing parts 44 of the injectors 12.

The fixed flanges 21 are provided on the rear delivery pipe 11.

As described above, the fixed flanges 21 are provided on the rear delivery pipe 11 located close to the dash panel 142 of the vehicle 100, and the cutouts 35 are provided in some or all of the fixed flanges 21 as needed. Therefore, at the time of front collision of the vehicle 100, each cutout 35 or a peripheral portion thereof is deformed, so that the collision between the rear delivery pipe 11 and the dash panel 142 is reduced. This makes it possible to more effectively suppress the deformation of the rear delivery pipe 11 and the deformation of the rod-shaped sealing parts 44 of the injectors 12.

The injectors 12 are oriented so that their axes extend in the front-rear direction of the vehicle 100, that is, the axial direction of each injector 12 coincides with the front-rear direction of the vehicle 100.

Accordingly, at the time of front collision of the vehicle 100, it is possible to more effectively prevent the acting direction of the impact on the rod-shaped sealing parts 44 of the injectors 12 from significantly deviating from the axis of each injector 12. Thus, the deformation of the rod-shaped sealing parts 44 of the injectors 12 can be prevented.

Second Example

A second example of the present disclosure will be described below with a focus on differences from the first example.

Figure 17:
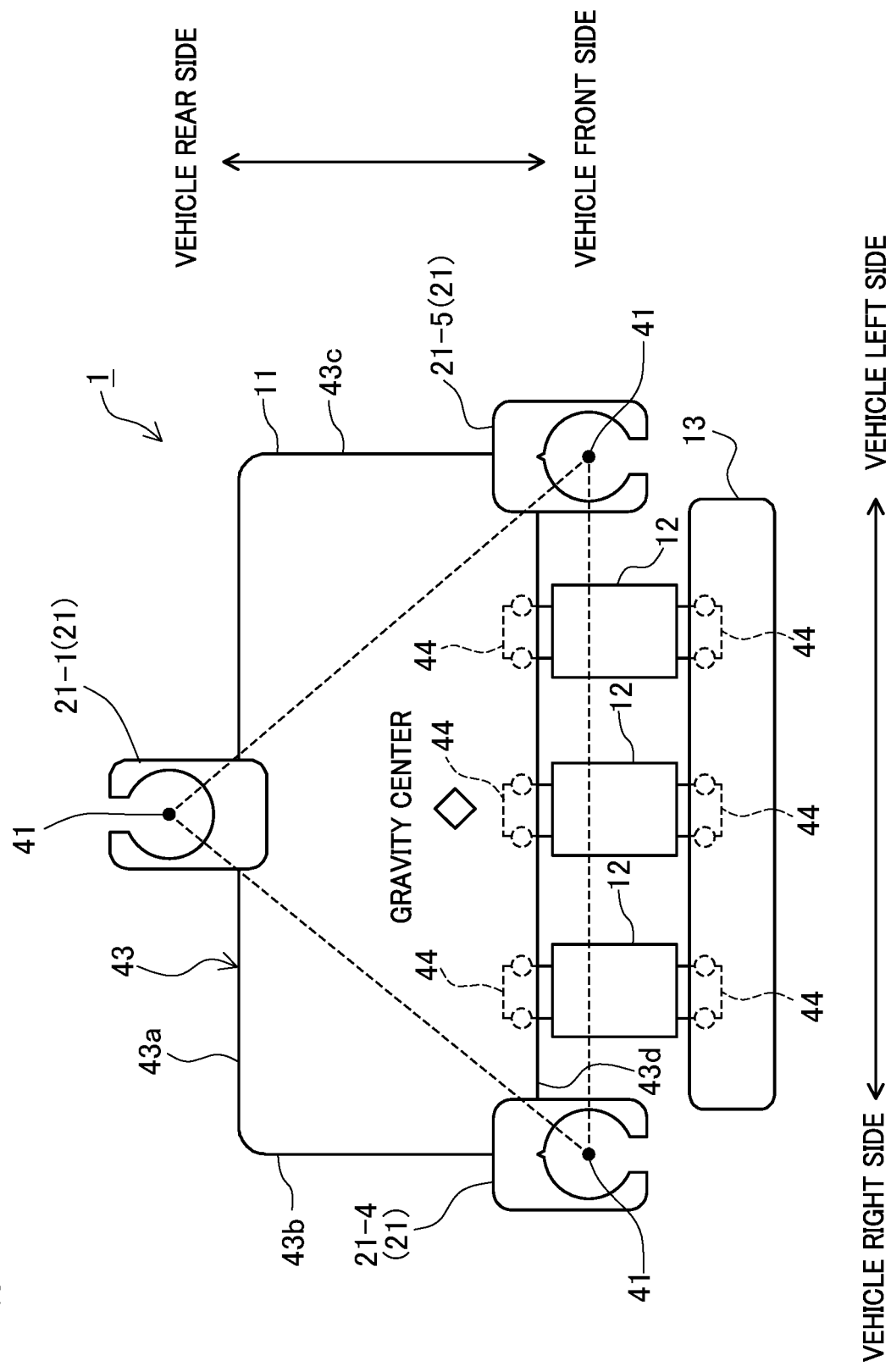
FIG. 17 is a configuration diagram of a hydrogen supply apparatus in second example.

In this second example, as shown in FIG. 17, the rear delivery pipe 11 is provided with three fixed flanges 21, i.e., a rear flange 21-1, a front right flange 21-4, and a front left flange 21-5.

The rear flange 21-1 is placed in the rear side delivery pipe 11 at a position on the rear side of the vehicle 100, i.e., on the "vehicle rear side" indicated in the figures, as in the first embodiment. The front right flange 21-4 is placed in the rear delivery pipe 11 at a position on the front side and the right side of the vehicle 100, i.e., on the "vehicle front side and vehicle right side" indicated in the figures. The front left flange 21-5 is placed in the rear side delivery pipe 11 at a position on the front side and the left side of the vehicle 100, i.e., on the "vehicle front side and vehicle left side" indicated in the figures.

Figure 18:
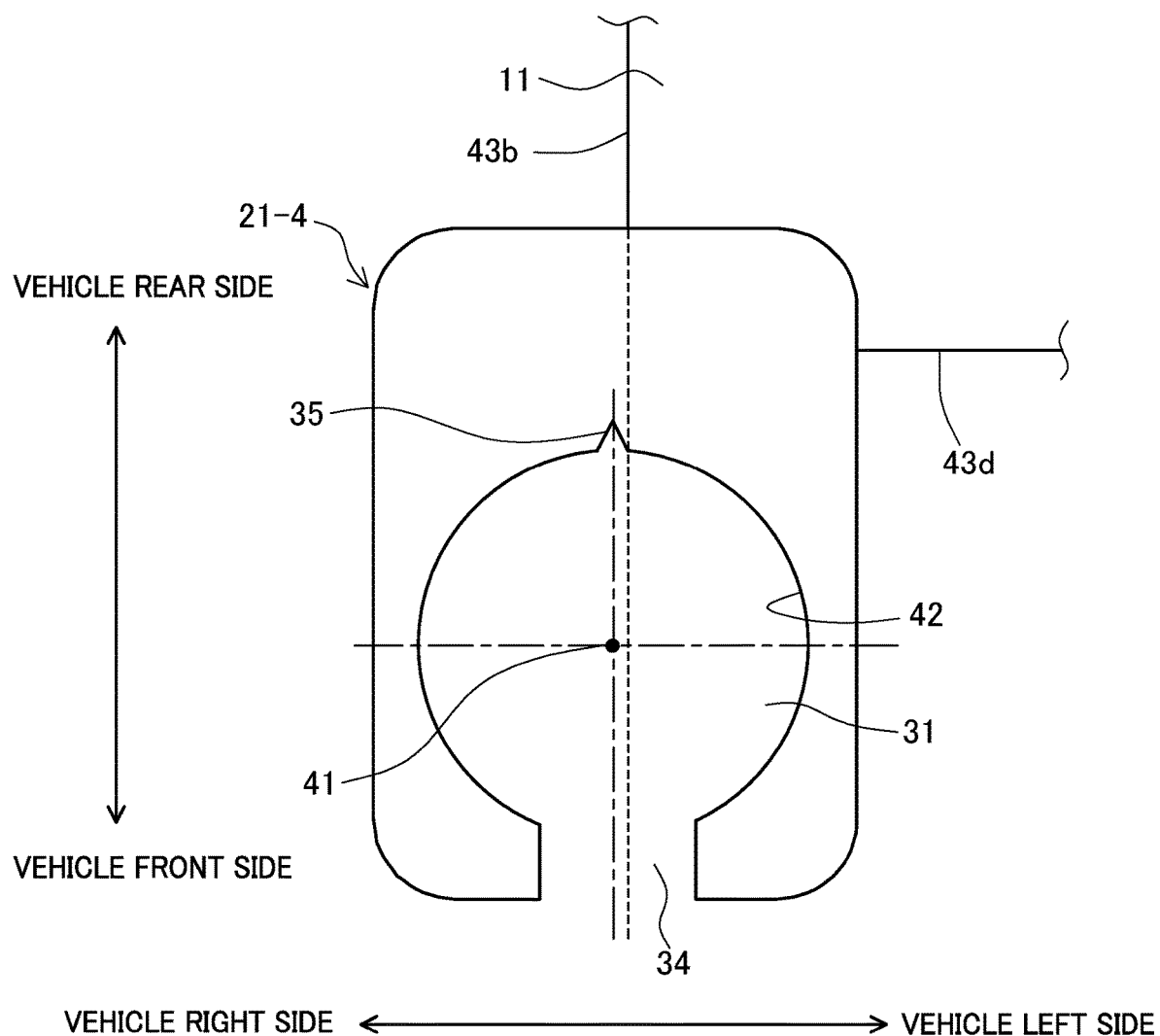
FIG. 18 is an enlarged view of a right flange and surrounding parts thereof in a second example.
Figure 19:
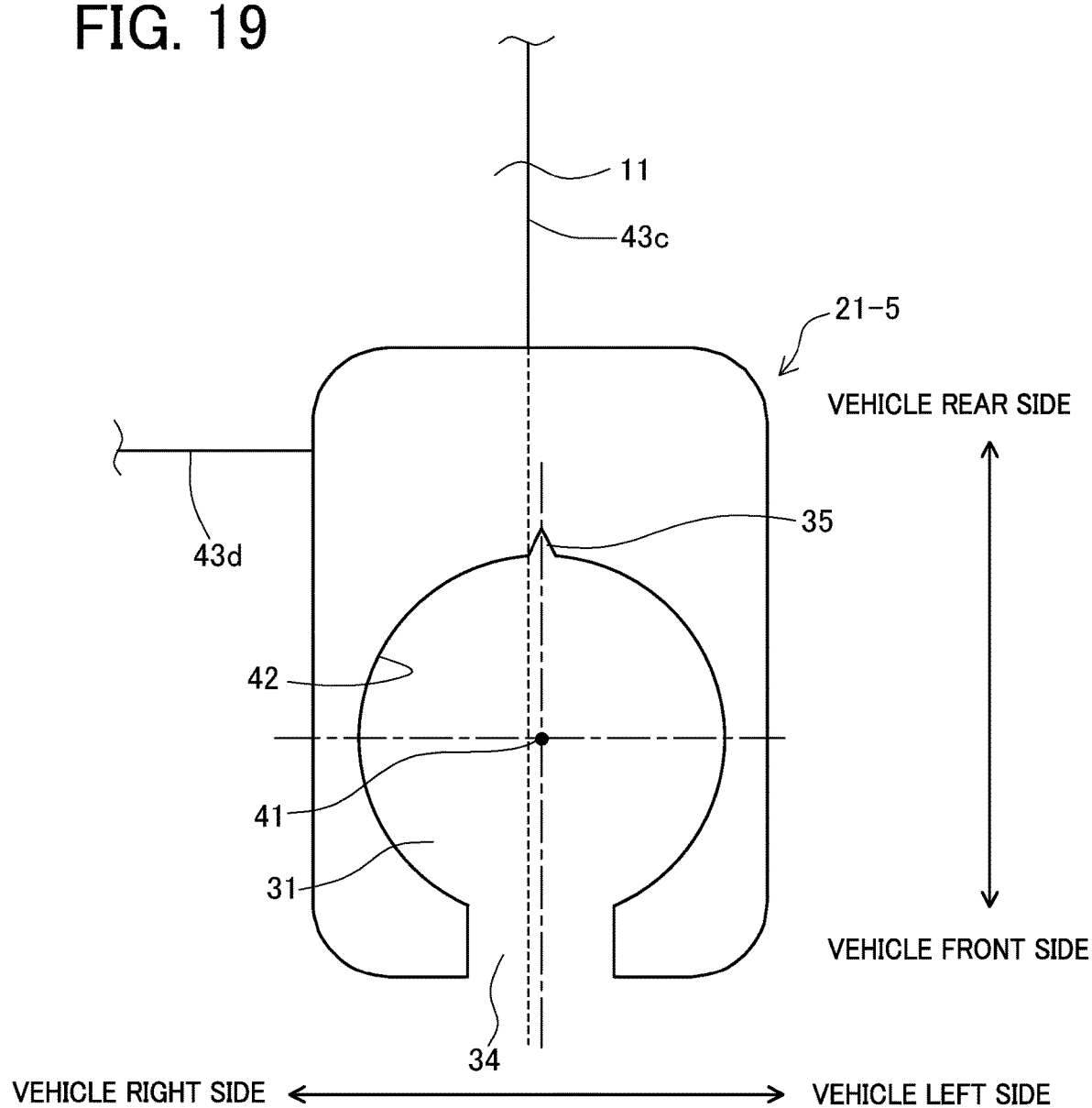
FIG. 19 is an enlarged view of a left flange and surrounding parts thereof in the second example.

As shown in FIGS. 17 to 19, when each fixed flange 21 is viewed along the central axis of the hole part 31, each fixed flange 21 has for example a substantially C-shape. Further, when the fixed flange 21 is viewed along the central axis of the hole part 31, the fixed flange 21 has an inner wall surface 42 defining the outer shape of the hole part 31 and having a substantially circular shape.

Those three fixed flanges 21 including the above rear flange 21-1, front right flange 21-4, and front left flange 21-5 are each provided with a hole part 31 and a gap 34 as shown in FIGS. 5, 18, and 19.

The three fixed flanges 21 are arranged so that the center of gravity of the hydrogen supply apparatus 1 is positioned within a triangular shape whose apexes are located at the centers 41 of the hole parts 31 of the fixed flanges 21.

Specifically, in the rear delivery pipe 11, the rear flange 21-1 is placed in a rear part 43a of an outer surface 43 located on the rear side of the vehicle 100 so as to be at the center position in the right-left direction of the vehicle 100, as in the first example.

The front right flange 21-4 is placed at a position of the joining section of a right part 43b of the outer surface 43 of the rear delivery pipe 11, which is located on the right side of the vehicle 100, and a front part 43d of the outer surface 43 of the rear delivery pipe 11, which is located on the front side of the vehicle 100. The front right flange 21-4 is oriented so that the gap 34 is located on the front side of the vehicle 100, namely, opens frontwards.

The front left flange 21-5 is placed at a position of the joining section between a left part 43c of the outer surface 43 of the rear delivery pipe 11, which is located on the left side of the vehicle 100, and the front part 43d of the outer surface 43 of the rear delivery pipe 11, which is located on the front side of the vehicle 100.

The front left flange 21-5 is oriented so that the gap 34 is located on the front side of the vehicle 100, namely, opens frontwards.

In this example, as shown in FIGS. 18 and 19, each of the front right flange 21-4 and the front left flange 21-5 includes a cutout 35.

This cutout 35 is provided at a position on the rear side of the vehicle 100 relative to the center 41 of the hole part 31.

Further, the cutout 35 is arranged at a position more outside than the outer surface 43 of the rear delivery pipe 11 in the right-left direction of the vehicle 100 as shown in FIGS. 18 and 19.

In this embodiment as well, since each of the front right flange 21-4 and the front left flange 21-5 is provided with the cutout 35, the hydrogen supply apparatus 1 is separated from the PCU 141 at the time of front collision of the vehicle 100, and hence the hydrogen supply apparatus 1 moves toward the front of the vehicle 100. This can prevent the deformation of the rear delivery pipe 11 and the deformation of the rod-shaped sealing parts 44 of the injectors 12, so that hydrogen leakage from the rear delivery pipe 11 and the rod-shaped sealing parts 44 of the injectors 12 can be suppressed. Consequently, the above configuration can prevent hydrogen leakage in the hydrogen supply apparatus 1 at the time of front collision of the vehicle 100.

Figure 20:
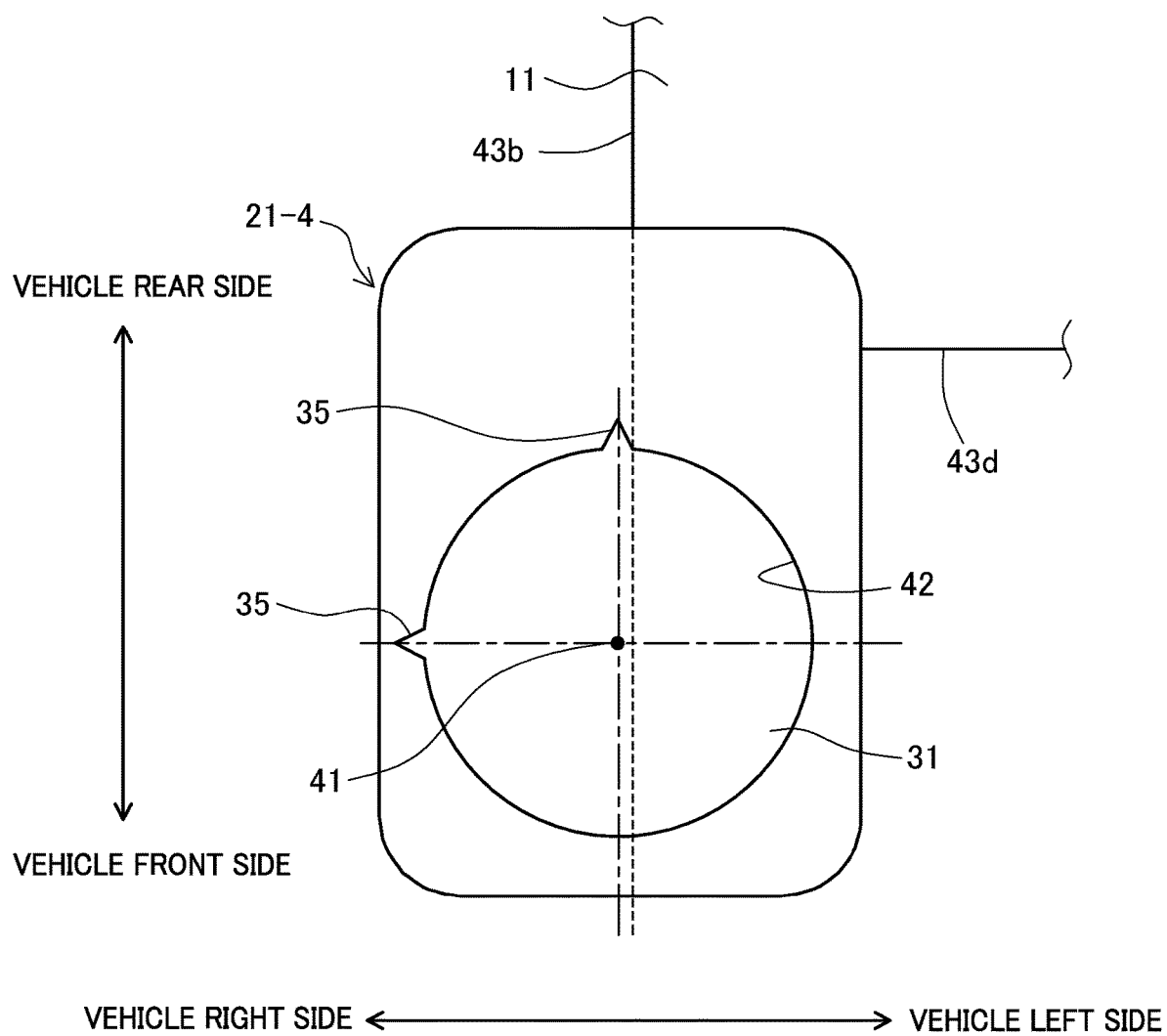
FIG. 20 is an enlarged view of a right flange and surrounding parts thereof in a modified example of the second example.
Figure 21:
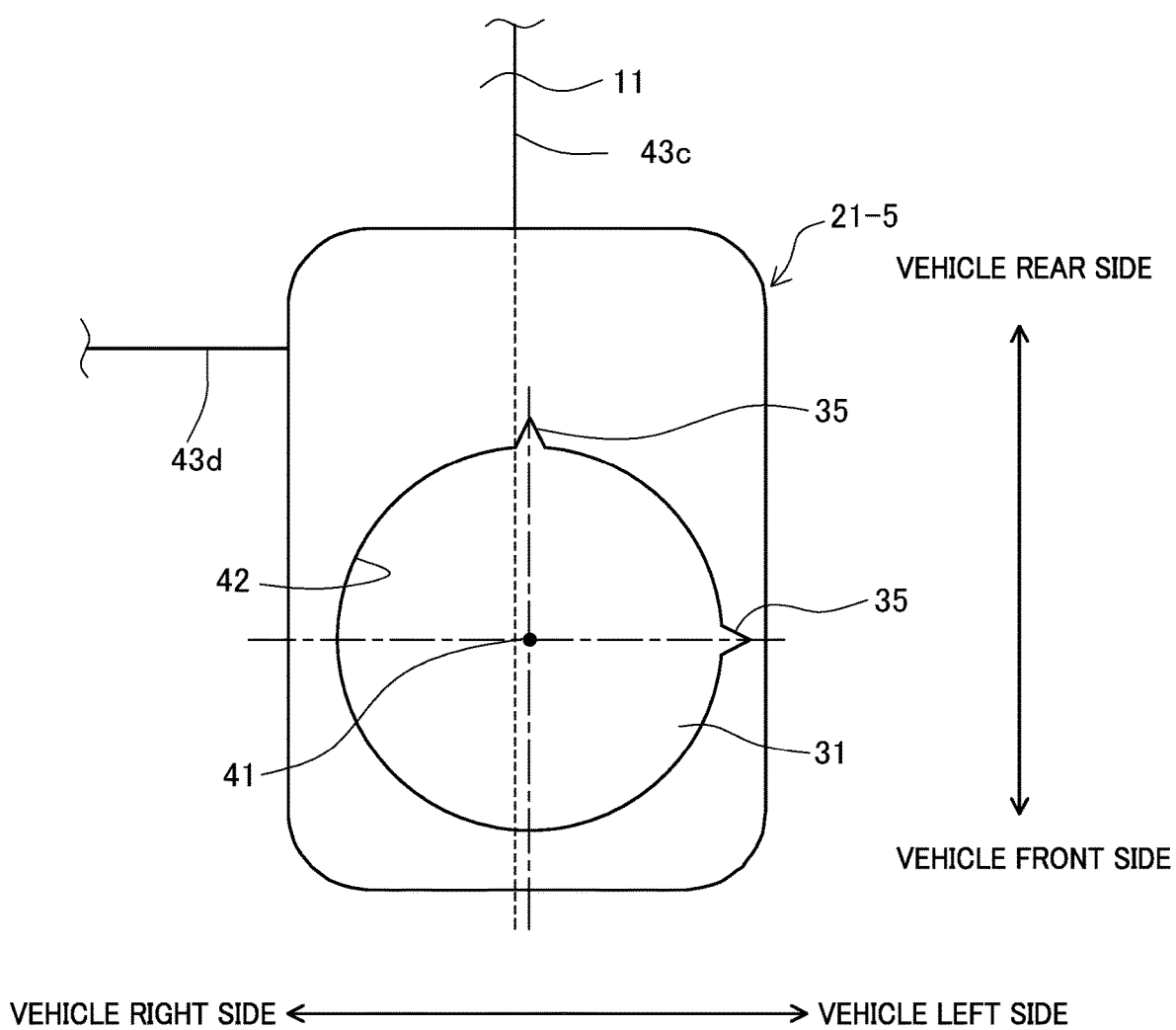
FIG. 21 is an enlarged view of a left flange and surrounding parts thereof in a modified example of second example.

As a modified example, as shown in FIGS. 14, 20, and 21, the fixed flange 21 may have a substantially O-shape when viewed along the central axis of the hole part 31.

In this modified example, as shown in FIG. 20, the front right flange 21-4 is provided with the cutouts 35 at positions on the rear side and the right side of the vehicle 100 relative to the center 41 of the hole part 31. As shown in FIG. 21, furthermore, the front left flange 21-5 is provided with the cutouts 35 at positions on the rear side and the left side of the vehicle 100 relative to the center 41 of the hole part 31.

The hydrogen supply apparatus 1 configured as above in the present example can also obtain the same operations and effects as those in the first example.

Other Modified Examples

Figure 22:
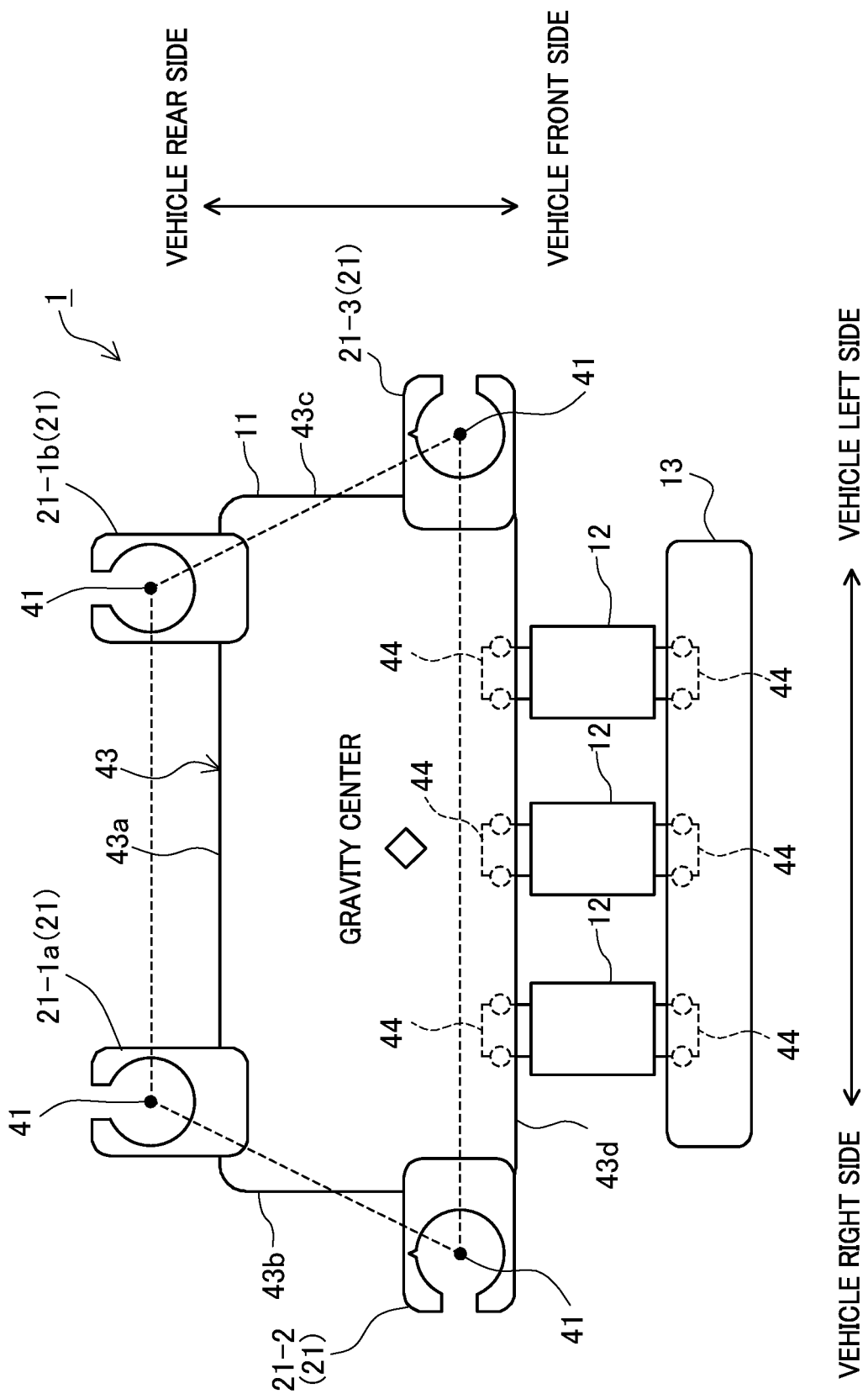
FIG. 22 is a configuration diagram of a hydrogen supply apparatus including four fixed flanges.

The number of fixed flanges 21 provided in the rear delivery pipe 11 is not particularly limited as long as it is 3 or more. As shown in FIG. 22, for example, the rear delivery pipe 11 is provided with four fixed flanges 21, i.e., a rear right flange 21-1a, a rear left flange 21-1b, a right flange 21-2, and a left flange 21-3.

In this configuration, the four fixed flanges 21 are arranged so that the gravity center of the hydrogen supply apparatus 1 is positioned within a rectangular shape having the apexes located at the centers 41 of the hole parts 31 in the four fixed flanges.

In the present example, as above, three or more fixed flanges 21 are arranged so that the gravity center of the hydrogen supply apparatus 1 is positioned within a polygonal shape whose apexes are located at the centers 41 of the hole parts 31 of the fixed flanges 21.

Figure 23:
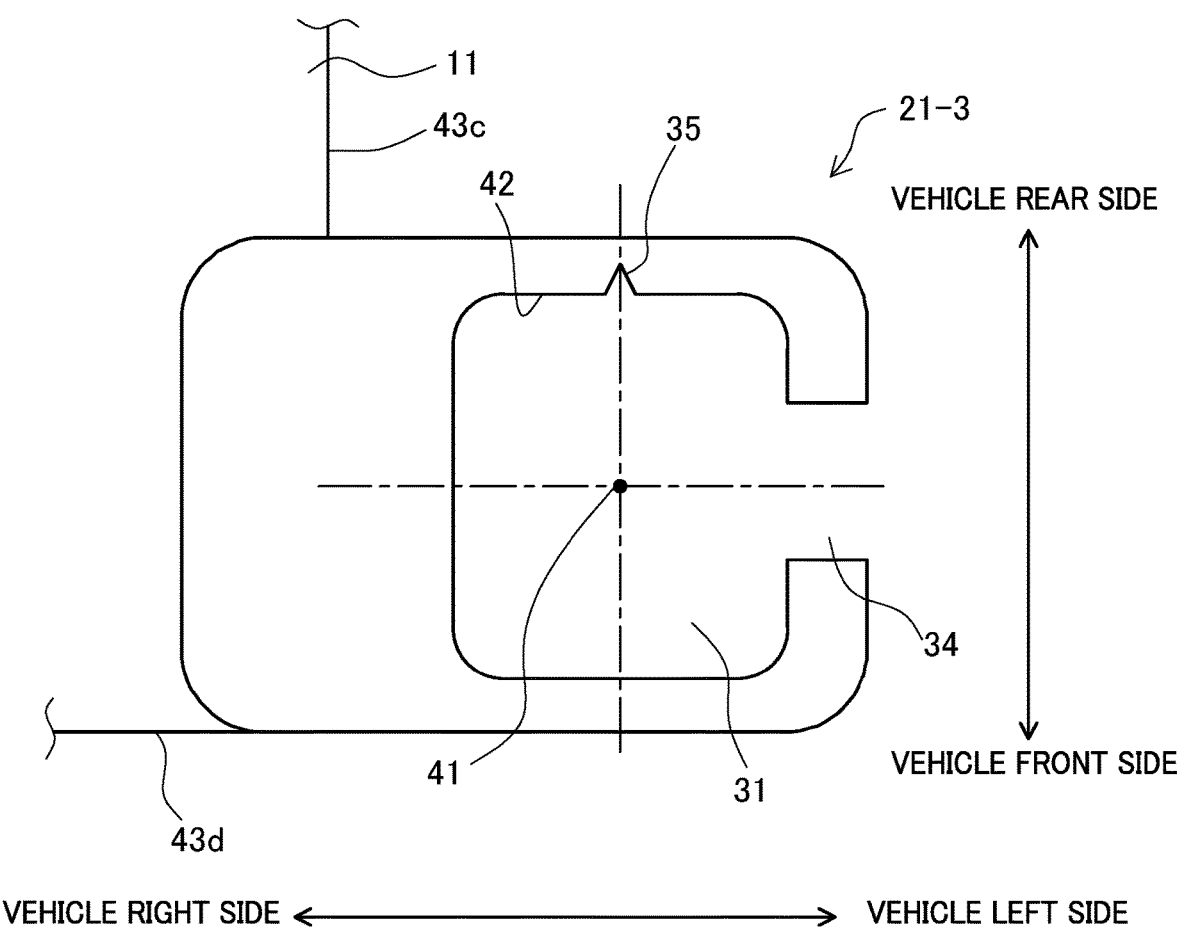
FIG. 23 is a diagram showing an example of a fixed flange having an inner wall surface formed in almost rectangular shape.
Figure 24:
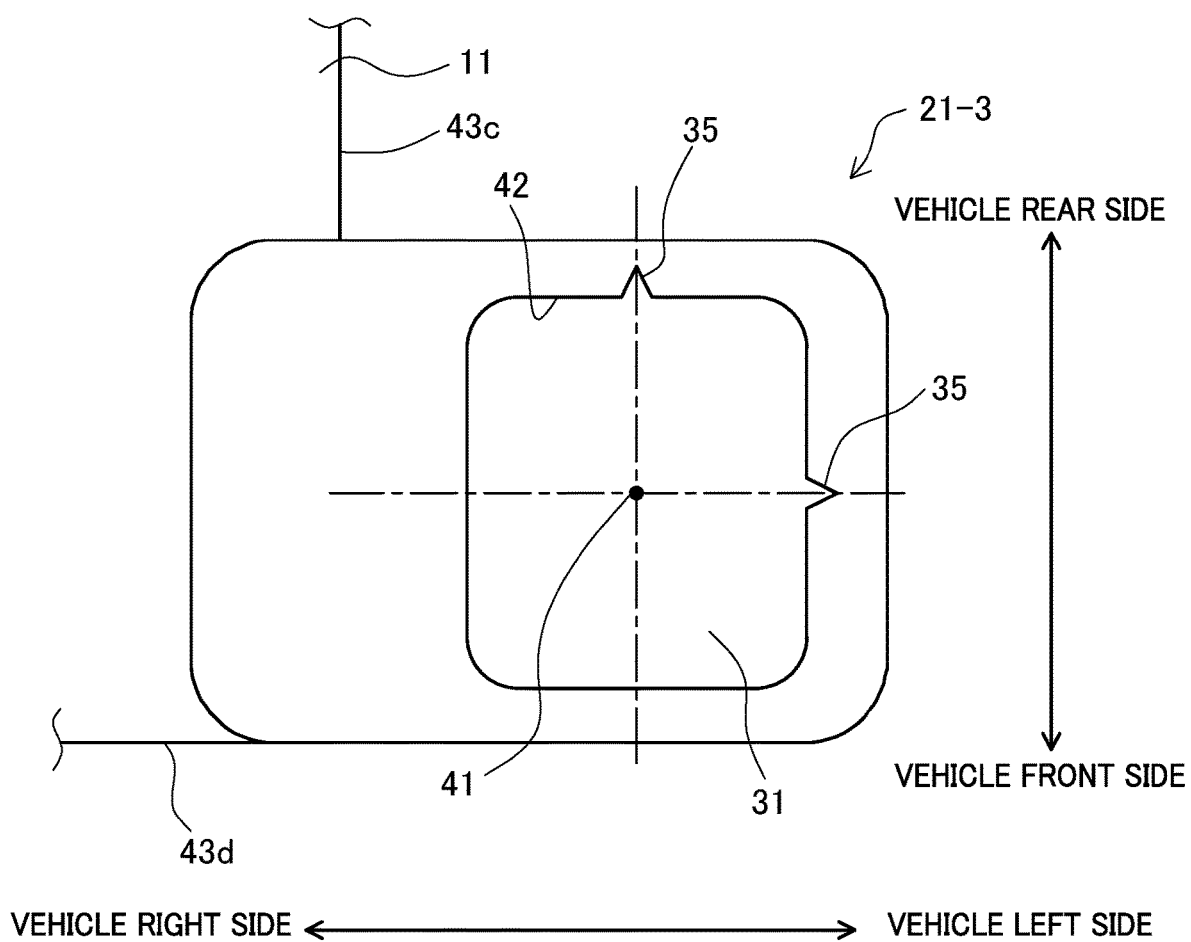
FIG. 24 is a diagram showing another example of a fixed flange having an inner wall surface formed in almost rectangular shape.

Furthermore, as shown in FIGS. 23 and 24, the inner wall surface 42 may have a substantially rectangular shape when the fixed flange 21 is viewed along the central axis of the hole part 31.

Figure 25:
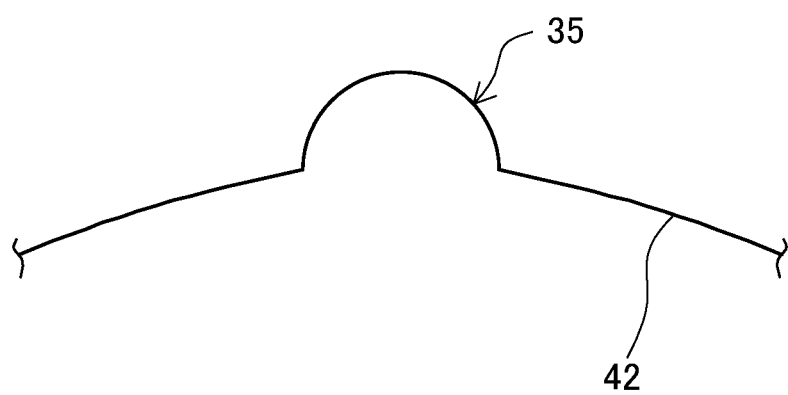
FIG. 25 is a diagram showing an example of a cutout having a circular-arc shape.

Each cutout 35 may have a circular-arc shape as shown in FIG. 25.

Figure 26:
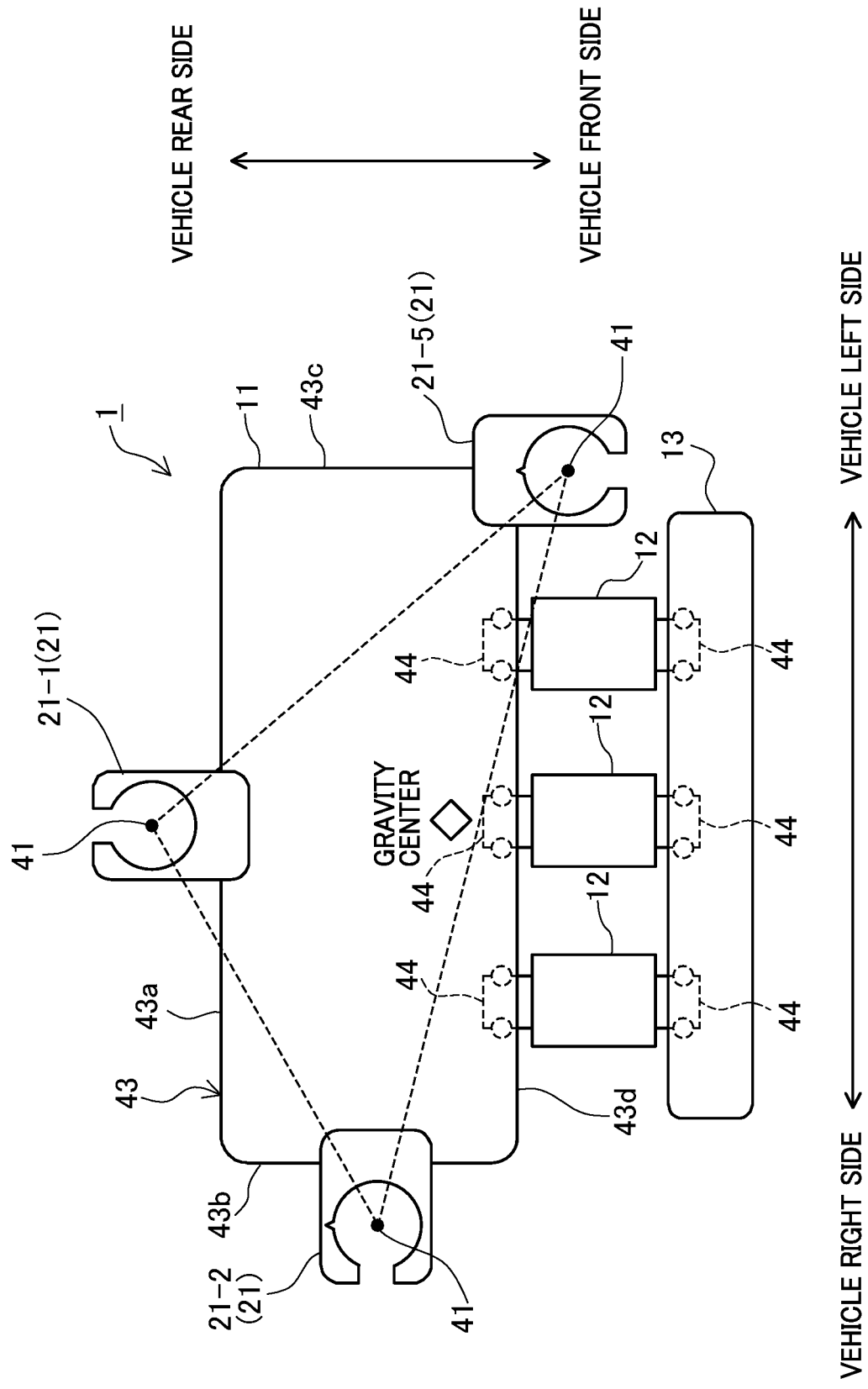
FIG. 26 is a configuration diagram of a hydrogen supply apparatus in an example that fixed flanges are arranged in different positions from the first example and others.

The positions of the fixed flanges 21 arranged in the rear delivery pipe 11 are not limited to the foregoing first and second examples. As another example, the rear delivery pipe 11 may be provided with three fixed flanges 21, i.e., the rear flange 21-1, the right flange 21-2, and the left flange 21-5, which are arranged at positions as shown in FIG. 26.

The foregoing embodiments are mere examples and give no limitation to the present disclosure. The present disclosure may be embodied in other specific forms without departing from the essential characteristics thereof.

REFERENCE SIGNS LIST

1 Hydrogen supply apparatus
11 Rear delivery pipe
12 Injector
13 Front delivery pipe
21 Fixed flange
21-1 Rear flange
21-1a Rear right flange
21-1b Rear left flange
21-2 Right flange
21-3 Left flange
21-4 Front right flange
21-5 Front left flange
31 Hole part
32 Bolt
34 Gap
35 Cutout
41 Center
42 Inner wall surface
43 Outer surface
44 Rod-shaped sealing part
100 Vehicle
100a Engine compartment
101 Fuel cell system
111 FC stack
112 Hydrogen system unit
121 Hydrogen supply passage 141 PCU
142 Dash panel

What is claimed is:

1. A fuel supply apparatus to be mounted in a vehicle, the fuel supply apparatus comprising:
   an injector;
   a delivery pipe connected to the injector; and
   a fixed flange provided at the delivery pipe and configured to fix the delivery pipe to one of components of the vehicle, wherein
   the fixed flange includes a hole part for insertion of a fastening member for fixing the delivery pipe to the one of components of the vehicle, and
   the fixed flange includes a fragile portion, which is a cutout formed in an inner wall surface defining the hole part.

2. The fuel supply apparatus according to claim 1, wherein the fragile portion is provided in the fixed flange at a position on a rear side of the vehicle relative to a center of the hole part.

3. The fuel supply apparatus according to claim 2, wherein the fragile portion is located, relative to an interior of the delivery pipe, outside of an outer surface of the delivery pipe in a right-left direction of the vehicle.

4. The fuel supply apparatus according to claim 1, wherein the fragile portion is located, relative to an interior of the delivery pipe, outside of an outer surface of the delivery pipe in a right-left direction of the vehicle.

5. The fuel supply apparatus according to claim 1, wherein
   the fixed flange includes three or more fixed flanges,
   each of the fixed flanges includes the hole part, and
   the fixed flanges are arranged so that a gravity center of a component group including the injector, the delivery pipe, and the fixed flanges is positioned within a polygonal shape whose apexes are located at centers of the hole parts of the fixed flanges.

6. The fuel supply apparatus according to claim 1, wherein
   the fuel supply apparatus is placed in an engine compartment located in a front of the vehicle,
   the delivery pipe includes a rear delivery pipe provided in a rear of the vehicle relative to the injector and a front delivery pipe provided in a front of the vehicle relative to the injector, and
   the fixed flange is provided in the rear delivery pipe.

7. The fuel supply apparatus according to claim 1, wherein the injector is placed so that its axis extends in a front-rear direction of the vehicle.

* * * * *